United States Patent [19]

Iizuka

[11] Patent Number: 5,515,352
[45] Date of Patent: May 7, 1996

[54] DIGITAL RECORDER FOR RECORDING GROUPED AND INTERLEAVED DIGITAL DATA OF MULTIPLE TRACKS

[75] Inventor: Nobuo Iizuka, Hamura, Japan

[73] Assignee: Casio Computer Co., Ltd., Tokyo, Japan

[21] Appl. No.: 164,305

[22] Filed: Dec. 8, 1993

Related U.S. Application Data

[63] Continuation of Ser. No. 807,053, Dec. 12, 1991, abandoned.

[30] Foreign Application Priority Data

Dec. 28, 1990 [JP] Japan ..................... 2-416545

[51] Int. Cl.⁶ ................................. G11B 20/10
[52] U.S. Cl. ................... 369/59; 360/32; 360/48
[58] Field of Search ................. 360/32, 18, 24, 360/48, 51; 364/900 MS; 369/48, 53–54, 59, 124

[56] References Cited

U.S. PATENT DOCUMENTS 4,433,415  2/1984  Kojima .................... 360/32 X
4,553,224  11/1985  Struger et al. ............... 364/900
4,758,907  7/1988  Okamoto et al. ............. 360/32 X

FOREIGN PATENT DOCUMENTS 62-159400  7/1987  Japan.

OTHER PUBLICATIONS

JAS Journal, Apr. 1989, pp. 16–22.

*Primary Examiner*—W. R. Young
*Attorney, Agent, or Firm*—Frishauf, Holtz, Goodman, Langer & Chick

[57] ABSTRACT

Audio data of multiple tracks is grouped and stored as if for one track on a hard disk. More specifically, audio data of multiple tracks is interleaved in association with track grouping and is stored in a buffer memory before being recorded on the hard disk. In play mode, the interleaved audio data is output via the buffer memory from the hard disk. At this time, the audio data is deinterleaved to be restored to the original multitrack audio data.

9 Claims, 16 Drawing Sheets

| b0 | OUTPUT |
|----|--------|
| 0  | DAK1   |
| 1  | DAK2   |

FIG. 4A

| b1 | b2 | OUTPUT |
|----|----|--------|
| 0  | 0  | DAK1   |
| 1  | 0  | DAK2   |
| x  | 1  | DAK3   |

FIG. 4B

| b3 | b4 | OUTPUT |
|----|----|--------|
| 0  | 0  | DAK1   |
| 1  | 0  | DAK2   |
| 0  | 1  | DAK3   |
| 1  | 1  | DAK4   |

FIG. 4C

| b0 | Y1 | Y2 |
|----|------|------|
| 0  | DRQ1 | 0    |
| 1  | 0    | DRQ2 |

FIG. 5A

| b1 | b2 | Y1   | Y2   | Y3   |
|----|----|------|------|------|
| 0  | 0  | DRQ1 | 0    | 0    |
| 1  | 0  | 0    | DRQ2 | 0    |
| x  | 1  | 0    | 0    | DRQ3 |

FIG. 5B

| b3 | b4 | Y1   | Y2   | Y3   | Y4   |
|----|----|------|------|------|------|
| 0  | 0  | DRQ1 | 0    | 0    | 0    |
| 1  | 0  | 0    | DRQ2 | 0    | 0    |
| 0  | 1  | 0    | 0    | DRQ3 | 0    |
| 1  | 1  | 0    | 0    | 0    | DRQ4 |

FIG. 5C

DIGITAL RECORDER FOR RECORDING GROUPED AND INTERLEAVED DIGITAL DATA OF MULTIPLE TRACKS

This application is a continuation of application Ser. No. 07/807,053, filed Dec. 21, 1991, now abandoned.

BACKGROUND OF THE INVENTION

1. Field of the Invention

The present invention relates to a digital recorder capable of digitally recording, reproducing or editing a digital signal such as a digital audio signal.

2. Description of the Related Art

Conventionally, as a method of recording, reproducing and editing an audio signal, an analog audio signal is recorded on a magnetic tape, and the recorded signal is reproduced or edited. Since this prior art involves analog recording/reproduction, deterioration of the sound quality is inevitable. Particularly, the deterioration will be prominent when the once-recorded audio signal is dubbed.

Further, the use of the magnetic tape as a recording medium raises problems such that it takes time to reach the target editing point, and editing requires that the target recorded portion of the magnetic tape be physically cut and pasted or be copied to somewhere else before actually executing the editing.

The problem about the deterioration of the sound quality can be overcome by employing a method of digitally recording data on a magnetic tape. However, there still remains a shortcoming concerning the freedom of locating the starting point or editing due to the use of a sequential-access type recording medium, and this problem cannot be overcome by simple digitization of data.

There has been proposed a solution to the conventional problems which uses a hard disk or a photoelectromagnetic disk as a recording medium. (Refer to, for example, U.S. patent application Ser. No. 07/690,710 filed on Apr. 24, 1991, now abandoned, (Inventor: Nobuo Iizuka) and U.S. patent application Ser. No. 07/752,876 filed on Aug. 30, 1991, now pending (Inventor: Atsushi Miyake).

In reproducing audio signals from multiple tracks of a disk, when editing is frequently performed, the number of times the disk access points become discontinuous increases, resulting in longer disk access time.

SUMMARY OF THE INVENTION

It is therefore a primary object of the present invention to provide a system which does not lower the accessing speed as much as possible when recording or reproducing digital data such as digital audio data.

Particularly, the present invention aims to avoid lowering of the accessing speed as much as possible when performing a multitrack recording or reproducing of digital data with respect to a disk medium, such as a hard disk or an opto-magneto disk.

According to one aspect of the present invention, there is provided a digital recorder comprising:

input/output means for executing an input/output operation of digital signal in association with multiple tracks of a recording medium;

buffer means capable of exchanging digital data with the input/output means for each track and temporarily storing the digital data in association with the tracks;

external memory means of a random access type capable of exchanging the digital data with the buffer means and having a storage area for multiple tracks which is accessible for a read/write operation of the digital data;

data transfer means for executing transfer of digital data for each track between the input/output means and the buffer means and transfer of digital data for each track between the buffer means and the external memory means in a time-shared manner while making a schedule in accordance with a predetermined priority order;

grouping means for grouping the multiple tracks in a changeable manner;

interleave means for interleaving the digital data for at least two tracks grouped by the grouping means as digital data for one track, transferring the interleaved digital data to the buffer means from the signal input/output means, and storing the interleaved digital data in the buffer means and the external memory means; and deinterleave means for deinterleaving the interleaved digital data and supplying the deinterleaved digital data as digital data for multiple tracks to the input/output means, when the interleaved digital data is read out from the external memory means and transferred to the buffer means.

This arrangement can reduce the occurrence of discontinuous accessing by the number of grouped tracks. For instance, if digital signals such as digital audio signals for right and left tracks are stored as one group, the number of discontinuous points becomes a half of what has occurred in the prior art, when the grouped digital signals are edited.

When a hard disk or an opto-magneto disk is used as external memory means, therefore, the number of times the head is moved to discontinuous address points on the disk is reduced, resulting in a faster accessing speed as compared with the case where digital data for individual tracks are recorded or reproduced separately (i.e., without interleaving/deinterleaving the audio data).

According to the above arrangement, since multiple tracks are freely grouped, a user can change the grouping freely in accordance with the modes of recording/reproducing digital data. This can widen the applicability of this digital recorder.

The present invention is not limited to the digital recorder with the above structure, but may have other various structures. For instance, the present invention may be realized as a reproducing apparatus.

More specifically, it is possible to provide a reproducing system comprising:

external memory means of a random access type having digital audio data for multiple tracks stored in an interleaved form as digital audio data for one track;

high-speed writable/readable buffer means for temporarily storing the interleaved digital audio data read out from the external memory means upon reception thereof;

deinterleave means for deinterleaving the interleaved digital audio data from the buffer means into digital audio data for the multiple tracks; and multitrack audio data output means for outputting the digital audio data for each track output from the deinterleave means.

Audio data has only to be stored in advance in an interleaved form in the external memory means, and the external memory means may be a medium which has audio data recorded therein in a fixed manner.

Further, the present invention may be realized as a storage system.

More specifically, it is possible to provide a storage system comprising:

multitrack audio data input means for inputting digital audio data;

interleave means for interleaving the digital audio data input from the audio data input means into digital audio data for one track;

high-speed writable/readable buffer means for temporarily storing the interleaved digital audio data from the interleave means upon reception thereof; and external memory means of a random access type, connected to the buffer means, for storing the interleaved digital audio data.

It would be apparent for those skilled in the art from the following description of preferred embodiments that the present invention may have other structures and may be modified in various other manners as well as realized in other applications.

BRIEF DESCRIPTION OF THE DRAWINGS

FIGS. 4A to 4C show diagrams for explaining the operation of a selector in FIG. 3;

FIGS. 5A to 5C show diagrams for explaining the operation of a multiplexer in FIG. 3;

DETAILED DESCRIPTION OF THE PREFERRED EMBODIMENT

Preferred embodiments of the present invention will now be described referring to the accompanying drawings.

General Structure

Figure 1:
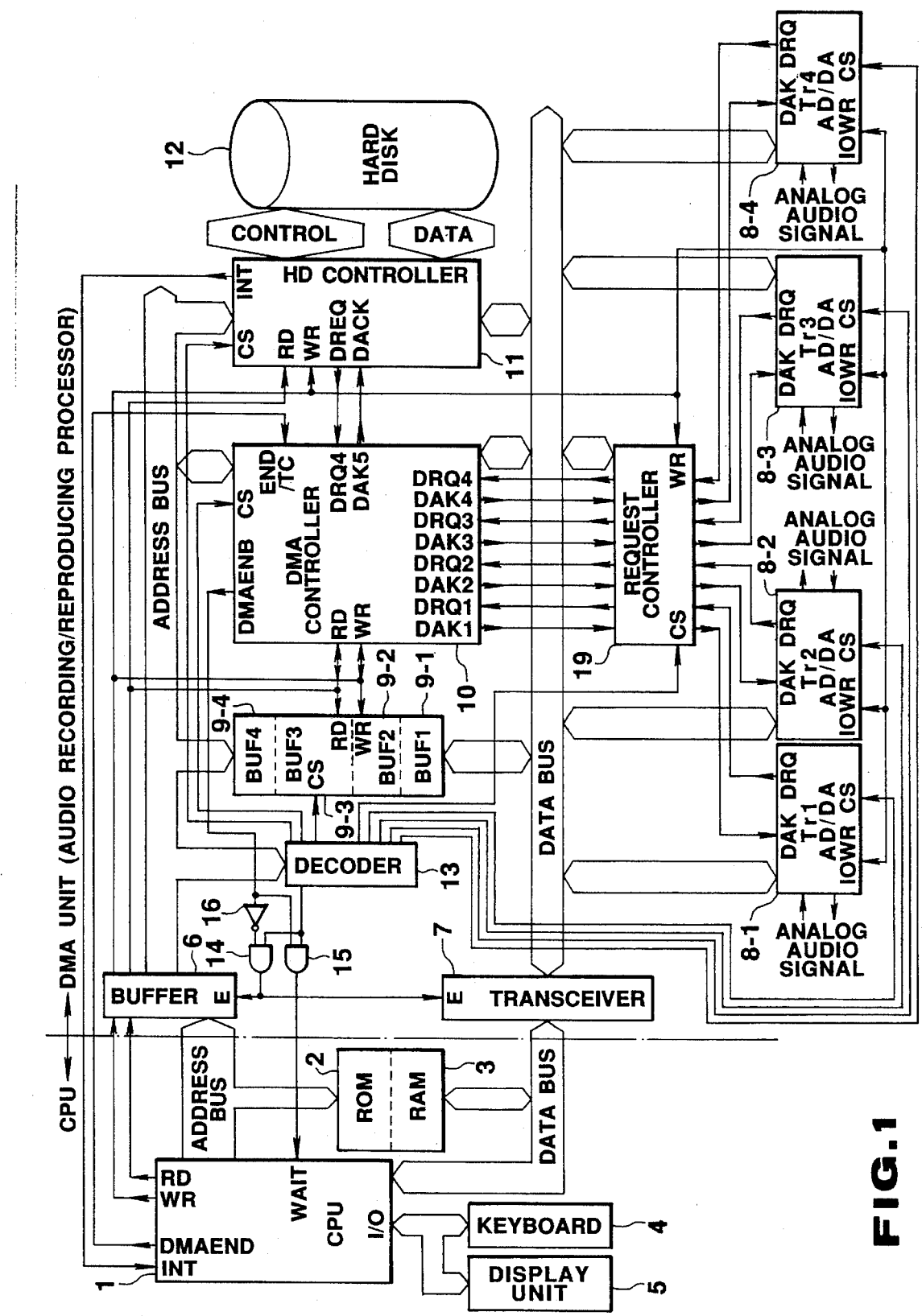
FIG. 1 is a diagram illustrating the structure of a digital recorder according to an embodiment of the present invention.

FIG. 1 illustrates the general structure of one embodiment, which is designed to be able to execute recording or playing with respect to up to four tracks at the same time. As illustrated, the digital recorder is divided into a CPU section (left-hand side in FIG. 1) and a DMA unit (right-hand side in the diagram), which is an audio recording/playing unit.

The CPU section comprises a CPU 1, a program ROM 2 in which a program (to be described in detail later) for specifying the operation of the CPU 1 is stored, a RAM 3, which includes an area for storing various data, an area for storing current pointers for four tracks and a work area, a keyboard 4, which is connected as a peripheral device to an I/O port of the CPU 1 and has various function keys and data input keys, and a display device 5, which includes a CRT or an LCD and its driver to provide various displays. As will be described later, in the real-time operation (recording/playing, for example), the CPU 1 controls individual components in the DMA unit as needed while an address bus and a data bus in the DMA unit are not busy. At the time of editing, the CPU 1 rearranges data blocks and manipulates a disk access pointer, for example. Setting a record/play mode for each track (hereafter referred to as "Tr"), starting and stopping the mode, locating the track, and designation of editing points can be effected using the keyboard 4, as will be described later. An address signal is sent from the CPU 1 through an address bus to the address terminals of the program ROM 2 and RAM 3 which have their output terminals connected through a data bus to the CPU 1 or a transceiver 7.

A buffer 6 and the transceiver 7 are provided in the DMA unit to connect the CPU section to the DMA unit. The buffer 6 is connected via the address bus to the CPU 1, and is connected to an address bus in the DMA unit. The transceiver 7 is connected via the data bus to the CPU 1, and is also connected to a data bus in the DMA unit.

Provided in the DMA unit are an audio I/O device 8-1 for Tr1, an audio I/O device 8-2 for Tr2, an audio I/O device 8-3 for Tr3 and an audio I/O device 8-4 for Tr4, which will independently receive or output an analog audio signal.

The audio I/O devices 8-1 to 8-4 each include a converter for selectively executing A/D or D/A conversion, a low pass filter for eliminating sampling noise and a clock circuit for generating a clock in a sampling period. When the mentioned tracks for the respective audio I/O devices 8-1 to 8-4 are set in record mode, each I/O device properly filters the analog signal from the outside every sampling period, and performs A/D conversion of the signal to acquire digital audio data. When those tracks are set in play mode, the digital audio data which has been read out in advance is subjected to D/A conversion every sampling period, and is then properly filtered before being output as an analog audio signal.

The audio I/O devices 8-1 to 8-4 for the respective Tr1 to Tr4 are connected via the data bus to buffers 9-1 (BUF1), 9-2 (BUF2), 9-3 (BUF3) and 9-4 (BUF4) to exchange digital audio data therewith.

These buffers 9-1 to 9-4 respectively correspond to Tr1 to Tr4 and exchange data respectively with the audio I/O devices 8-1 to 8-4 in a direct memory access (DMA) system under the control of a DMA controller 10.

A request controller 19 is located between the audio I/O devices 8-1 to 8-4 and the DMA controller 10 to control the transfer of request signals DRQ and acknowledge signals DAK therebetween. The structure and the operation of this request controller 19 will be discussed later.

In record mode, the audio I/O devices 8-1 to 8-4 request the DMA controller 10 for DMA transfer (single transfer) of digital data which is associated with one sampling from the devices 8-1 to 8-4 to the buffers 9-1 to 9-4 in the sampling period. That is, the audio I/O devices 8-1 to 8-4 send DRQ signals via the request controller 19 to the DMA controller 10 (signal DRQ1 for Tr1, DRQ2 for Tr2, DRQ3 for Tr3 and DRQ4 for Tr4 when interleave and deinterleave controls to be described later are not performed). The data transfer will actually be executed when the audio I/O devices 8-1 to 8-4 receive the response from the DMA controller 10, i.e., when the DMA controller 10 sends DAK1 for Tr1, DAK2 for Tr2, DAK3 for Tr3 and DAK4 for Tr4 as acknowledgement through the request controller 19 when the interleave and deinterleave controls (to be described later) are not executed. In play mode, the audio I/O devices 8-1 to 8-4 request the DMA transfer (single transfer) of digital data associated with one sampling from the buffers 9-1 to 9-4 to the devices 8-1 to 8-4 during the sampling period. Then, the data transfer is performed by the DMA controller 10 as described above.

The buffers 9-1 to 9-4 each have a memory capacity of storing digital audio data for one sampling or multiple samplings. The individual buffers 9-1 to 9-4 are designed to function as FIFO buffers by dividing the RAM, for example, into Tr1 to Tr4 and using each as a ring buffer (a buffer whose last address and first address are imaginarily linked together).

The buffers 9-1 to 9-4 are addressed through the address bus by the DMA controller 10. In other words, while the DMA transfer is being performed, the address bus, the data bus and a control signal line in the DMA unit are used by the DMA controller 10 alone.

The buffers 9-1 to 9-4 exchange data with a hard disk 12 through the data bus under the control of a disk controller (hereafter referred to as "HD controller") 11. The hard disk 12 and the HD controller 11 are connected to each other by the data bus and the control signal line. The HD controller 11 controls every read/write access to the hard disk 12. The hard disk 12 has four separate storage areas for the respective four tracks Tr1 to Tr4. The DMA controller 10 serves to transfer data between the hard disk 12 and the buffers 9-1 to 9-4 by sending an interrupt (INT) to the CPU 1 after the HD controller 11 transfers one data block, and sending a command to the CPU 1 to transfer the next data block. Upon receiving the interrupt signal INT from the HD controller 11, the CPU 1 sets the DMA controller 10 and the HD controller 11 to the desired mode, or programs them, then allows the controllers to do the DMA transfer. A detailed description of this operation will be given later.

In play mode, the DMA controller 10 functions to read a predetermined amount (corresponding to plural sampling periods) of digital audio data from the hard disk 12, and execute DMA transfer (block transfer) to a specified buffer among the buffers 9-1 to 9-4. In record mode, the DMA controller 10 reads a predetermined amount (corresponding to plural sampling periods) of digital audio data from the specified buffer, and conducts DMA transfer (block transfer) of the data to a designated position on the hard disk 12.

For data transfer between the hard disk 12 and the buffers 9-1 to 9-4, the HD controller 11 sends a request signal DREQ to the DMA controller 10 (the DMA controller 10 receives the signal as DREQ4). When data transfer is possible, the HD controller 11 receives a response signal DACK from the DMA controller 10 (the DMA controller 10 outputs the signal as DAK5), entering the actual transfer mode.

As described above, the DMA controller 10 performs time-shared data transfer in five channels: data transfer between the audio I/O devices 8-1 to 8-4 for Tr1 to Tr4 and the buffers 9-1 to 9-4 in four channels (CH1–CH4 to be described later) and data transfer in one channel (CH5 to be described later) between the hard disk 12 and one of the buffers 9-1 to 9-4, which is selected sequentially.

The CPU 1 supplies an address signal to the buffer 6 through the address bus to control the functions, actions and operations of the individual components in the DMA unit. The CPU 1 also supplies signals CS for designating the components through the buffer 6 to a decoder 13, then sends the signals CS to the audio I/O devices 8-1 to 8-4, the buffers 9-1 to 9-4, the DMA controller 10, the HD controller 11 and the request controller 19. At the same time, the CPU 1 exchanges various data with these components via the data bus through the transceiver 7.

Further, the CPU 1 sends a designation signal WR, which designates if the audio I/O devices 8-1 to 8-4 should be set to the record mode (write mode) or the play mode (read mode), to the IOWR terminals of the respective devices 8-1 to 8-4 through the buffer 6.

The CPU 1 also sends through the buffer 6 the designation signal (write signal) WR and another designation signal (read signal) RD to the buffers 9-1 to 9-4, the DMA controller 10 and the HD controller 11, to read data from or write data in the components. The DMA controller 10 also outputs these signals RD and WR in DMA transfer mode. The relationship between those signals and the functions and operations of the individual components will be described later.

The DMA controller 10 sets a DMA enable signal DMAENB to "1" and outputs it while the DMA transfer is performed between the components. When the signal DMAENB is sent to an AND gate 14 through an inverter 16, the output of the gate 14 becomes "0". As a result, an enable signal E is sent as "0" to the buffer 6 and the transceiver 7 to disable the CPU section and the DMA unit to exchange data and addresses with each other. When a signal of "1" is sent to an AND gate 15 from the decoder 13 in this case, the output of the gate 15 becomes "1", allowing a wait signal WAIT to be supplied to the CPU 1.

When DMA transfer starts while the CPU 1 is sending a predetermined signal to the decoder 13 to enable the buffer 6 and the transceiver 7 in order to control the DMA unit, i.e., while the CPU 1 is sending a signal of "1" from the decoder 13 to one of the input terminals of the AND gate 14 (when the CPU 1 outputs an address signal to access one of the buffers 9-1 to 9-4, the DMA controller 10, the HD controller 11 and the audio I/O devices 8-1 to 8-4, the output of the decoder 13 becomes active, sending a "1" to one input terminal of each of the AND gates 14 and 15), the CPU 1 receives the signal WAIT to execute the DMA transfer by priority over other operations. After the DMA transfer is completed, the WAIT is released to restart the operation of the CPU 1.

Even if the CPU 1 tries to access the DMA controller 10, while the DMA controller 10 is executing the DMA transfer, the signal WAIT is sent from the AND gate 15 to the CPU 1, and a period of the execution cycle of the CPU 1 is made longer to disable the buffer 6 and the transceiver 7 during this period.

In short, the CPU 1 can access the individual components in the DMA unit under the following two conditions:

(1) When the CPU 1 outputs an address to access an individual component of the DMA unit.

(2) When the signal DMAENB is inactive ("0"), i.e., when the data bus of the DMA unit is not busy.

The CPU 1, however, can continue processing without considering when to access the DMA unit in accordance with the action of gates 14 and 15.

To alter the operating state of the DMA unit immediately in response to a key input or the triggering by the control data, the CPU 1 can send a command DMAEND to the DMA controller 10 to stop DMA transfer whatever state the controller 10 is in. (The command is sent as an END signal to the DMA controller 10.)

Structure of Essential Portions of DMA Controller 10

One example of the structure of the DMA controller 10 will now be explained. The DMA controller 10 can transfer in a bus cycle of several hundred nanoseconds. Therefore, it takes one to two microseconds to transfer sampling data for four tracks.

with a sampling frequency fs of 48 KHz, the interval of one sampling period is approximately 21 microseconds. It is thus possible to assign most of the sampling time interval to data transfer between the buffers 9-1 to 9-4, the HD controller 11 and the hard disk 12, and the time for the CPU 1 to program the individual components.

Figure 2:
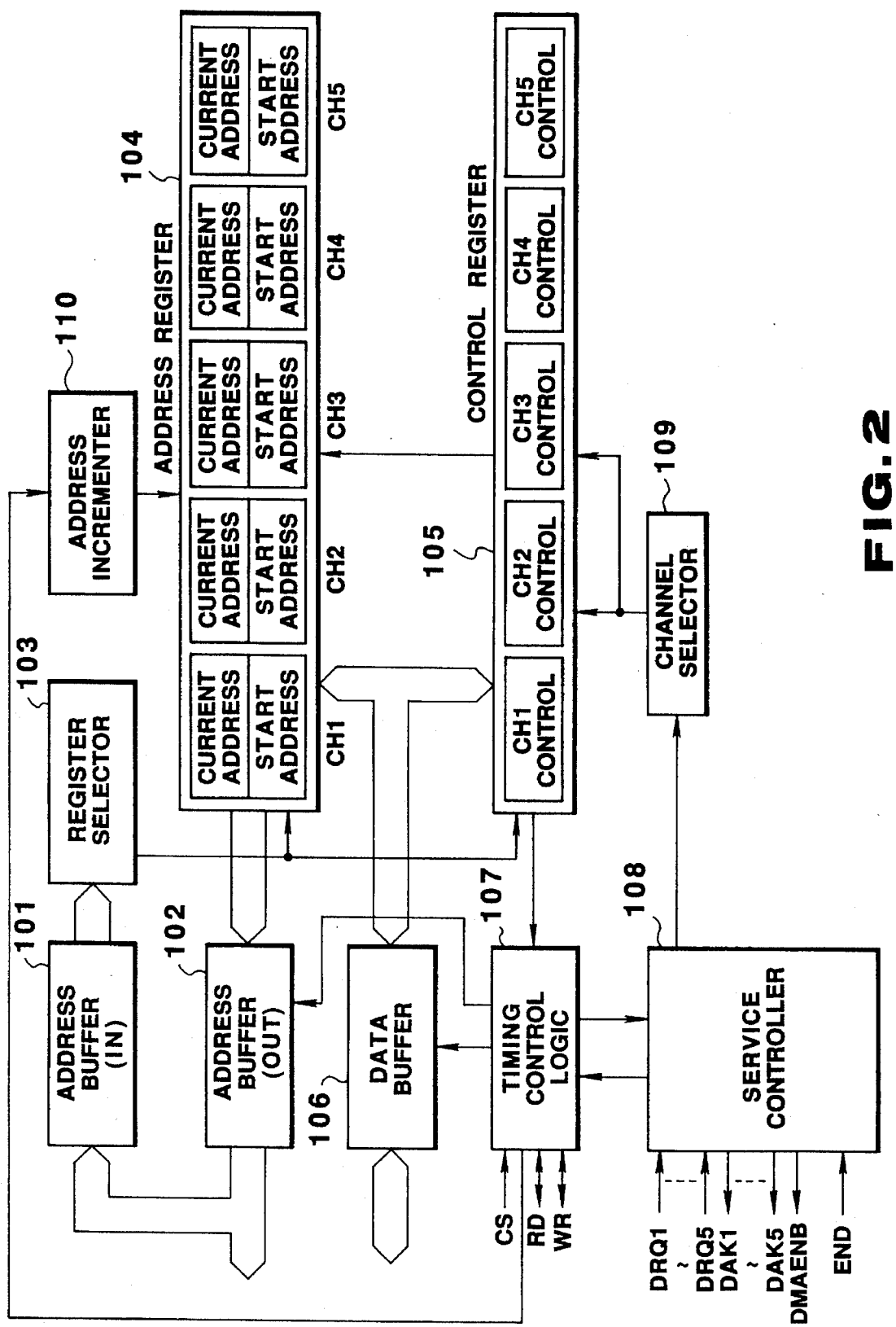
FIG. 2 is a diagram illustrating the structure of one example of a DMA controller shown in FIG. 1.

The specific structure of the essential portions is exemplified in FIG. 2. The DMA controller 10 includes an address buffer 101 on the input side (IN) to be connected to the address bus, and an address buffer 102 on the output side (OUT). According to the address signal sent to the address buffer 101, what is designated by a register selector 103 is changed to designate desired registers present in an address register 104 and a control register 105.

There are five channels CH1 to CH5 in both the address register 104 and the control register 105; the channels CH1 to CH4 are registers for DMA transfer between the buffers 9-1 to 9-4 and the audio I/O devices 8-1 to 8-4, and the channel CH5 is a register for DMA transfer between a designated one of the buffers 9-1 to 9-4 and the hard disk 12.

Each of the channels (registers) CH1 to CH5 in the address register 104 has an area for storing at least the current addresses and start addresses of the corresponding buffer 9-1, 9-2, 9-3 or 9-4 and the designated buffer. The channels CH1 to CH5 in the control register 105 store, for example, control data for designating the direction of DMA transfer.

The contents of the address register 104 and the control register 105 can be input from and output to the data bus through the data buffer 106. A timing control logic 107, a service controller 108 and a channel selector 109 control these components.

The service controller 108 is of a hard logic type or a microprogram-controlled type. The controller 108 receives a signal from the timing control logic 107, the DMA request signals DRQ1 to DRQ5 from the audio I/O devices 8-1 to 8-4 and the HD controller 11 and the DMA end command END (DMAEND) from the CPU 1, outputs the acknowledge signals DAK1 to DAK5 to these components. The controller 108 outputs the DMA enable signal DMAENB indicating that the DMA transfer is in progress. Further, the controller 108 sends various commands to the timing control logic 107, and a channel select signal to a channel selector 109. The channel selector 109 selectively designates those registers in the address register 104 and the control register 105 which correspond to the channels CH1 to CH5.

In response to the designation signal CS from the decoder 13, the control signal from the control register 105 and the control signal from the service controller 108, the timing control logic 107 performs the I/O control of the address buffer 102 and the data buffer 106, and enables an address incrementer 110 to increase the current address of the designated channel in the address register 104.

Structure of Essential Portions of Request Controller 19

Figure 3:
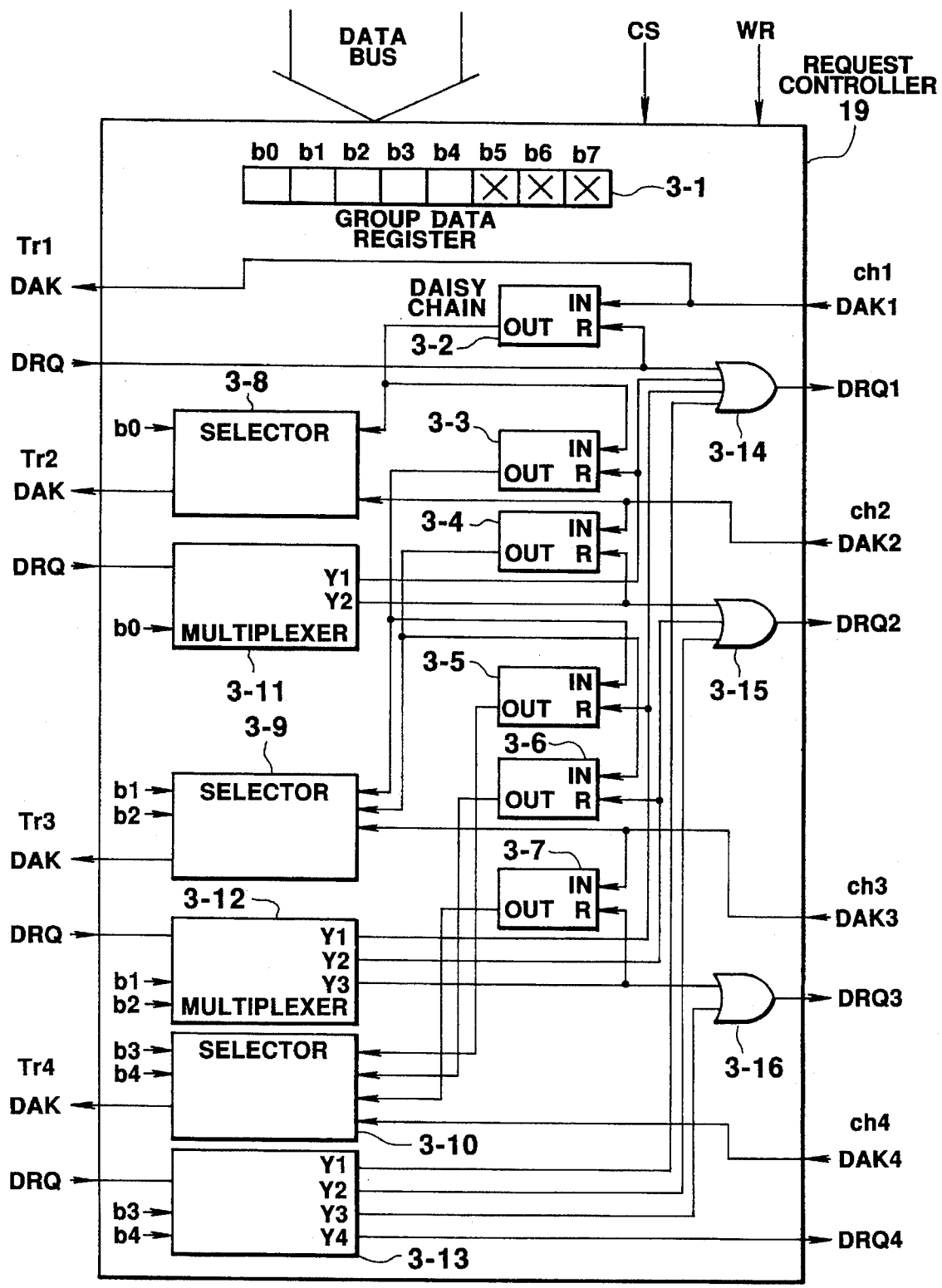
FIG. 3 is a diagram illustrating the structure of one example of a request controller shown in FIG. 1.

Referring now to FIG. 3 the request controller 19 will be described. A group data register 3-1 latches group data supplied from the CPU 1. While this group data register 3-1 has an 8-bit configuration, only the lower five bits (b0 to b4) are used substantially. The group data is supplied to selectors 3-8, 3-9 and 3-10 and multiplexers 3-11, 3-12 and 3-13. The selectors 3-8 to 3-10 each select one of multiple inputs and output the selection in association with the group data. The multiplexers 3-11 to 3-13 each send out outputs corresponding to the group data from terminals Y1 to Y4. Daisy chains 3-2 to 3-7 each output an input on an input terminal IN directly to a terminal OUT when a "0" is input to a terminal R. When a "1" is input to the terminal R, each daisy chain sets the output on the terminal OUT to "0" irrespective of the input on the terminal IN.

FIGS. 4A to 4C present diagrams used for explaining the select operation of the selectors 3-8 to 3-10. The selector 3-8 receives DAK1, output from the DMA controller 10, via the daisy chain 3-2, as well as directly receives DAK2 from the DMA controller 10. The selector 3-8 selects and outputs DAK1 when group data b0 is "0," while selecting and outputting DAK 2 when the group data b0 is "1" (FIG. 4A). The selector 3-9 receives DAK1 and DAK2 via the daisy chains 3-3 and 3-4, as well as directly receives DAK3 from the DMA controller 10. The selector 3-9 selects and outputs DAK1 when group data b1 and b2 are "0" and "0," selects and outputs DAK 2 when they are "1" and "0," and selects and outputs DAK3 when the group data b2 is "1" (FIG. 4B). The selector 3-10 receives DAK1, DAK2 and DAK3 via the daisy chains 3-5, 3-6 and 3-7, as well as directly receives DAK4 from the DMA controller 10. The selector 3-10 selects and outputs DAK1 when group data b3 and b4 are "0" and "0," selects and outputs DAK 2 when they are "1" and "0," selects and outputs DAK3 when they are "0" and "1," and selects and outputs DAK4 when they are "1" and "1" (FIG. 4C).

FIGS. 5A to 5C present diagrams used for explaining the select operation of the multiplexers 3-11 to 3-13. The multiplexer 3-11 receives DRQ from Tr2 (audio I/O device 8-2), and outputs DRQ1 from the terminal Y1 when the group data b0 is "0" and outputs DRQ2 from the terminal Y2 when the group data b0 is "1" (FIG. 5A). The multiplexer 3-12 receives DRQ from Tr3 (audio I/O device 8-3), and outputs DRQ1 from the terminal Y1 when the group data b1 and b2 are "0" and "0," outputs DRQ2 from the terminal Y2 when they are "1" and "0," and outputs DRQ3 from the terminal Y3 when the group data b2 is "1" (FIG. 5B). The multiplexer 3-13 receives DRQ from Tr4 (audio I/O device 8-4), and outputs DRQ1 from the terminal Y1 when the group data b3 and b4 are "0" and "0," outputs DRQ2 from the terminal Y2 when they are "1" and "0," outputs DRQ3 from the terminal Y3 when they are "0" and "1," and outputs DRQ4 from the terminal Y4 when they are "1" and "1" (FIG. 5C).

As there are four tracks Tr1 to Tr4, four types of grouping are possible. The first grouping is to provide four groups as follows, in which case the individual tracks Tr1 to Tr4 are independent from one another.

1/2/3/4

The second grouping is to provide three groups in which case two of the four tracks are grouped together, while the remaining two tracks work independently. There are six ways of grouping in this manner:

1,2/3/4
1,3/2/4
1,4/2/3
1/2,3/4
1/2,4/3
1/2/3,4

The third grouping is to provide two groups, with the following seven ways available:

1,2/3,4
1,3/2,4
1,4/2,3
1,2,3/4
1,2,4/3
1,3,4/2
1/2,3,4

The fourth grouping is to put all the tracks into one group as follows:

/1,2,3,4/

Assignment of the individual groups to the DMA channels is performed in such a way that one with the highest priority is assigned to CH1, one with the second highest priority is assigned to CH2, and so forth.

Suppose that the group data b0 to b7 are "11000XXX."
Then, there are two groups set as follows:

1,4/2,3

The operation of the channel assignment will be described below. Assume that the tracks Tr1 to Tr4 (audio I/O devices 8-1 to 8-4) have output DMA requests (DRQ) simultaneously at one sampling time. DRQ of Tr1 is output as DRQ1 to the DMA controller 10 via an OR gate 3-14. As the DMA controller 10 should provide the service for the channel CH1 by priority, it outputs DAK1 to CH1. This DAK1 is supplied as DAK directly to the Tr1 (audio I/O device 8-1). The audio I/O device 8-1 returns DRQ to "0" as its request has been acknowledged. Since the group data b3 and b4 are "0" and "0" at present, however, the data "1" ( DRQ ) is output from the terminal Y1 of the multiplexer 3-13. Therefore, a "1" is kept supplied as DRQ1 to the DMA controller 10 via the OR gate 3-14. Then the DMA controller 10 determines that a request for the channel CH1 has still been made, and sets DAK1 to "1" again. Although this DAK1 is sent as DAK again to Tr1, Tr1 disregards this input because it has already inverted DRQ to "0." Meanwhile, since the daisy chain 3-2 has received DRQ of Tr1 as a "0" at the terminal R, it outputs the second DAK1 from the DMA controller 10 to the selector 3-8. As the group data b0 in the selector 3-8 is now "1," the selector 3-8 does not select DAK1 from the daisy chain 3-2.

The output of the daisy chain 3-2 is also supplied to the daisy chain 3-3. Since the group data b0 is "1," the output at the terminal Y1 of the multiplexer 3-11 becomes "0" and the daisy chain 3-3 sends the output of the daisy chain 3-2 to the selector 3-9 as well as the daisy chain 3-5. The selector 3-9 disregards the output (DAK1) of the daisy chain 3-3 because the group data b1 and b2 are "1" and "0." Since the group data b1 and b2 are "1" and "0," the terminal Y1 of the multiplexer 3-11 has a "0" and the daisy chain 3-5 sends the output of the daisy chain 3-3 to the selector 3-10. As the group data b3 and b4 are "0" and "0," the selector 3-10 selects the output (DAK1) of the daisy chain 3-5, and sends it as DAK to the audio I/O device 8-4. As a result, the audio I/O device 8-4 considers that its request has been acknowledged, and inverts the DRQ to "0." In this manner, the data of the group consisting of Tr1 and Tr4 is sequentially written (interleaved) into the buffer 9-1 in record mode, and words sequentially read out from the buffer 9-1 are respectively supplied to the Tr1 and Tr4 (deinterleaved) in play mode.

Since the group data b0 in the multiplexer 3-11 is now "1," DRQ of Tr2 is output from its terminal Y2. This DRQ is supplied as DRQ2 to the DMA controller 10 via an OR gate 3-15. Consequently, the DMA controller 10 performs its service for CH2 which has the next highest priority to CH1.

When the DMA controller 10 sends DAK2 to the request controller 19 in response to the input DRQ2, this DAK2 is input to the selector 3-8 and the daisy chain 3-4 in the request controller 19. As the group data b0 is "1," the selector 3-8 selects this DAK2 and outputs it as DAK to the audio I/O device 8-2. Upon reception of the DAK, the audio I/O device 8-2 recognizes it as a response to its own request and inverts the DRQ to "0." As a result, the output at the terminal Y2 of the multiplexer 3-11 is inverted to "0." Since the DRQ output from the audio I/O device 8-3 is "1" and the group data b1 and b2 are "1" and "0," however, the multiplexer 3-12 has a "1" at its terminal Y2. The DRQ2 sent to the DMA controller 10 from the OR gate 3-15 therefore remains "1." Consequently, the DMA controller 10 determines that a request for the channel CH2 has still been made, and inverts DAK2 to "1" again.

This DAK2 is selected by the selector 3-8, and is supplied to the audio I/O device 8-2. Since the audio I/O device 8-2 has already inverted the request signal DRQ to "0," it disregards this input. Meanwhile, the daisy chain 3-4 receives the input DAK2, and sends the DAK2 to the selector 3-9 and the daisy chain 3-6 because a "0" is input to the terminal R from the terminal Y2 of the multiplexer 3-11. Since the group data b1 and b2 are "1" and "0," the selector 3-9 selects the DAK2 input from the daisy chain 3-4 and sends it as DAK to the audio I/O device 8-3. The audio I/O device 8-3 recognizes the input as a response to its own request and inverts the DRQ to "0." Accordingly, the output at the terminal Y2 of the multiplexer 3-12 is inverted to "0," and the DRQ2 supplied via the OR gate 3-15 to the DMA controller 10 is inverted to "0."

While the DAK2 output from the daisy chain 3-6 is input to the selector 3-10, the selector 3-10 does not select it because the group data b3 and b4 are "0" and "0."

Since the group data b1 and b2 are currently set to "1" and "0," the output at the terminal Y3 of the multiplexer 3-12 is set to "0." Even when the audio I/O device 8-3 sets DRQ to "1," therefore, the DRQ3 supplied via an OR gate 3-16 to the DMA controller 10 remains "0" ( at this time, the multiplexer 3-13 also has a "0" at the terminal Y3 to be described later). As the group data b3 and b4 are "0" and "0," the terminals Y3 and Y4 of the multiplexer 3-13 are kept at "0." Consequently, the DRQ4 supplied to the DMA controller 10 remains "0," and the DMA controller 10 will not perform its service for CH3 and CH4.

While the foregoing description has been given with reference to the case where Tr1 and Tr4 are put into one group and Tr2 and Tr3 into another group, in any grouping mentioned earlier, the request controller 19 performs the associated operation.

Figure 6A:
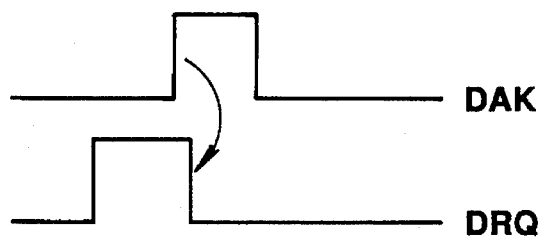
FIGS. 6A to 6D show diagrams for explaining the operation of the request controller shown in FIG. 3.
Figure 6B:
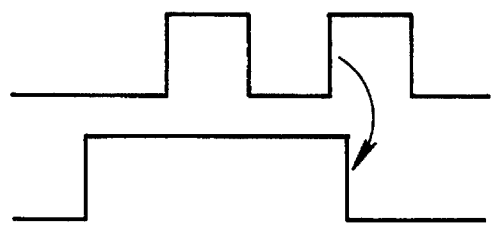

FIGS. 6A to 6D illustrate the relationship between DRQ and DAK in the request controller 19. As described above, in the case of two tracks associated with one channel, when DRQ is inverted to "1," DAK is inverted to "1" first accordingly, as shown in FIG. 6B. As the DRQ is not inverted to "0" yet, however, the DAK is inverted again to "1." In response to the second inversion, the DRQ is inverted to "0."

Figure 6C:
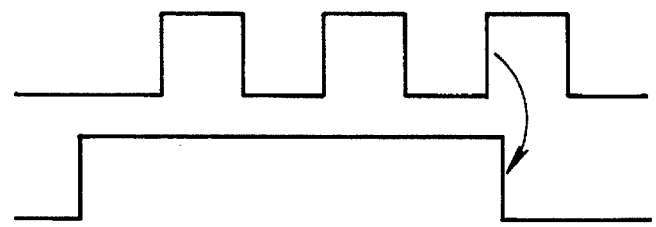
Figure 6D:
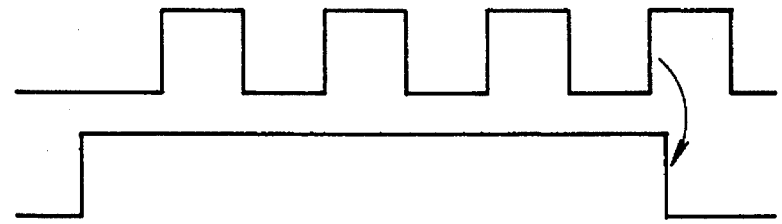

In the case where one track is associated with one channel, by way of contrast, when DRQ is inverted to "1," DAK is inverted to "1" accordingly, as shown in FIG. 6A. Then, the DRQ is immediately inverted to "0" in response to the first inversion of the DAK to "1." Likewise, in the case of three tracks associated with one channel or in the case of four tracks associated with one channel, when DAK is inverted to "1" three times or four times after the inversion of DRQ to "1," the DRQ is inverted to "0," as shown in FIG. 6C or 6D.

Figure 16:
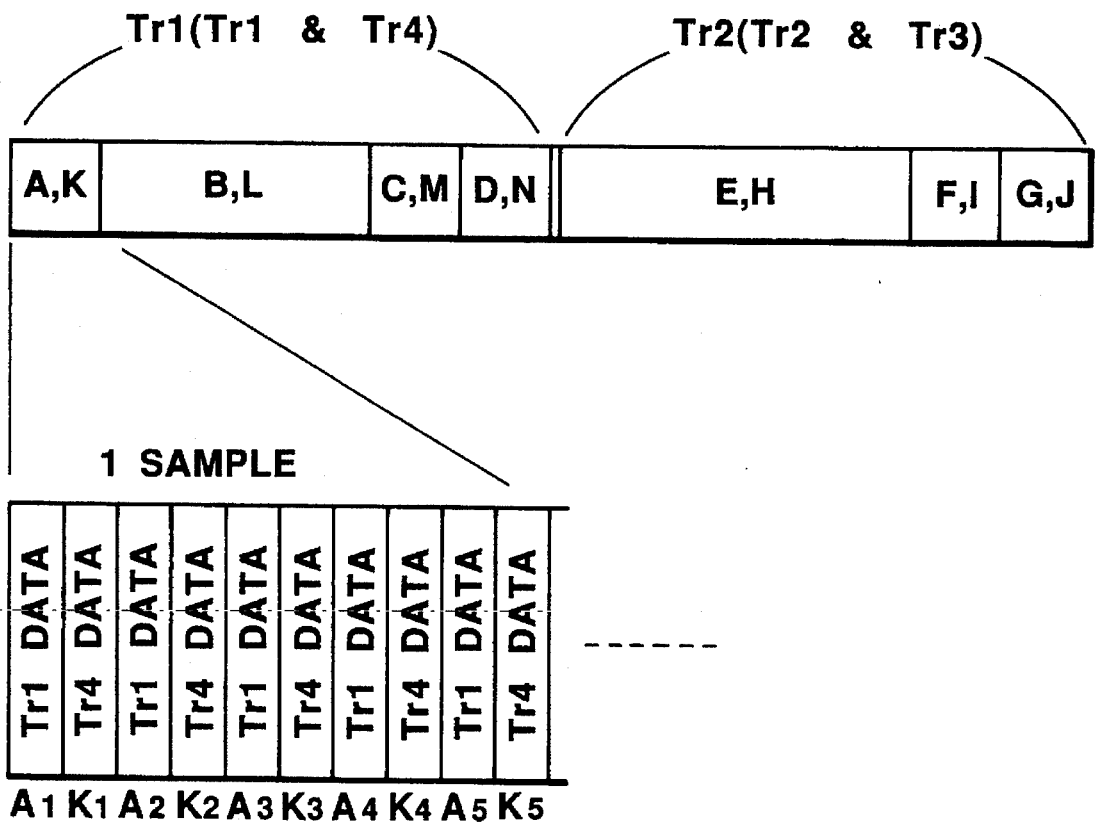
FIG. 16 is a diagram for explaining a data recorded state according to the embodiment in FIG. 1.

With the above grouping, the data of the grouped audio I/O devices 8-1 (Tr1) and 8-4 (Tr4) is interleaved and recorded on the track Tr1 for one channel on the hard disk 12, as shown in FIG. 16. That is, assuming that the original data of Tr1 is A, B, C and D and the original data of Tr4 is K, L, M and N, then A and K, B and L, C and M, and D and N would alternately be arranged on the track Tr1 on the hard disk 12. Likewise, the data of the grouped audio I/O devices 8-2 (Tr2) and 8-3 (Tr3) is interleaved and recorded on the track Tr2 for one channel on the hard disk 12. At this time, the original data of Tr2 is E, F and G, while the original data of Tr3 is H, I and J.

General Operation of CPU 1

Figure 7:
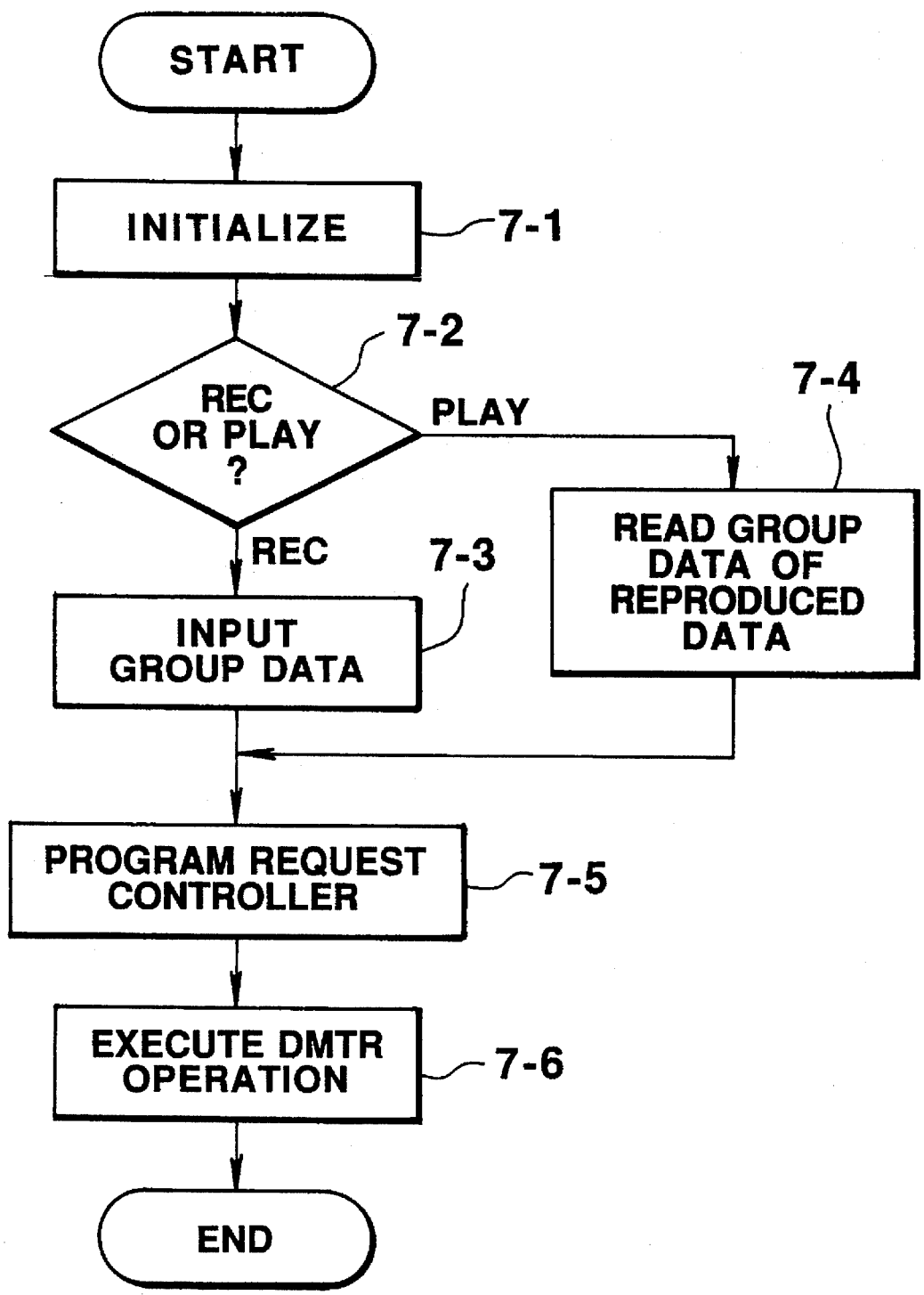
FIG. 7 is a diagram for explaining the operation of the embodiment shown in FIG. 1.
Figure 8:
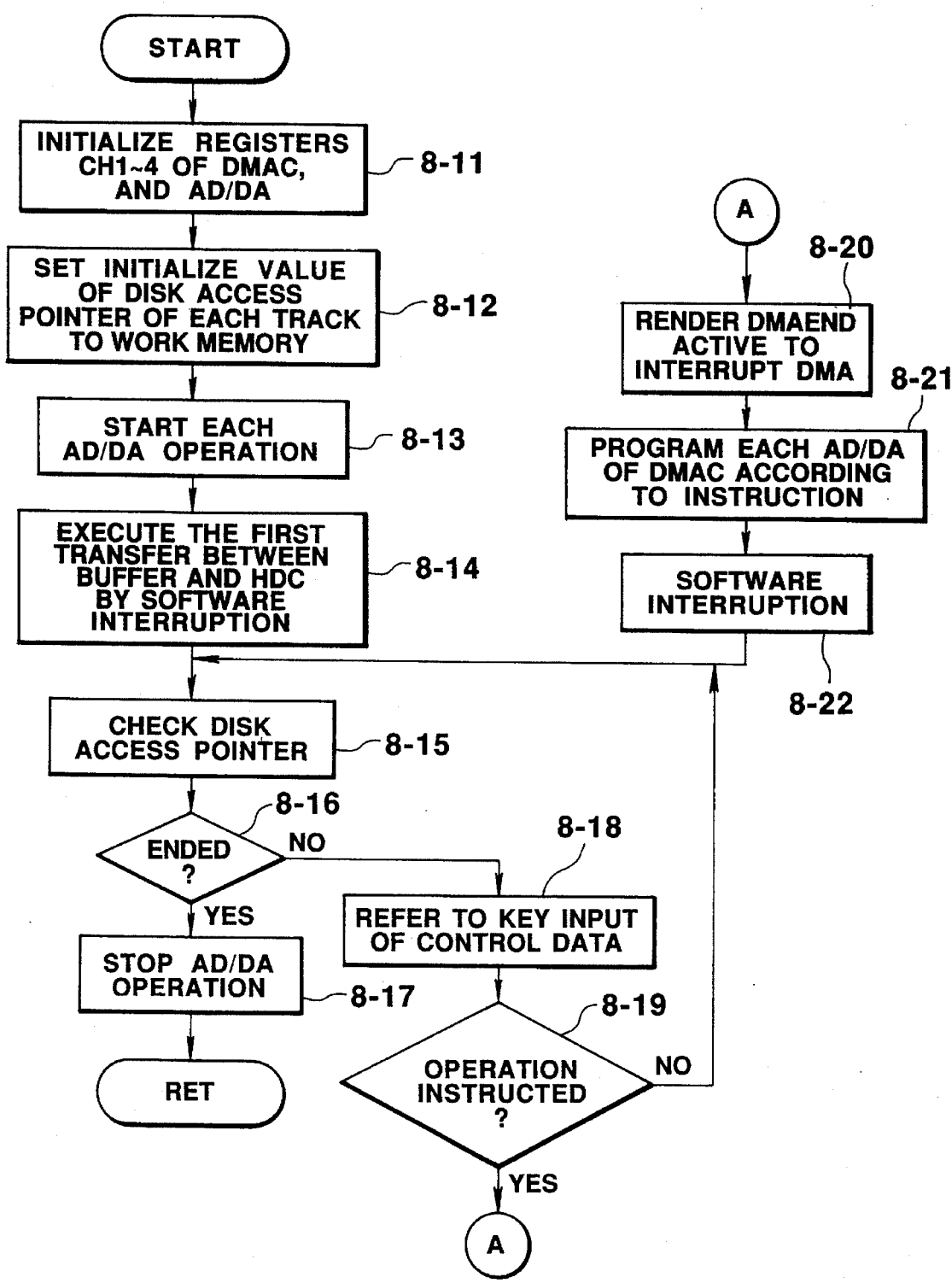
FIG. 8 is a flowchart for a subroutine of a DMTR operation in FIG. 7.
Figure 9:
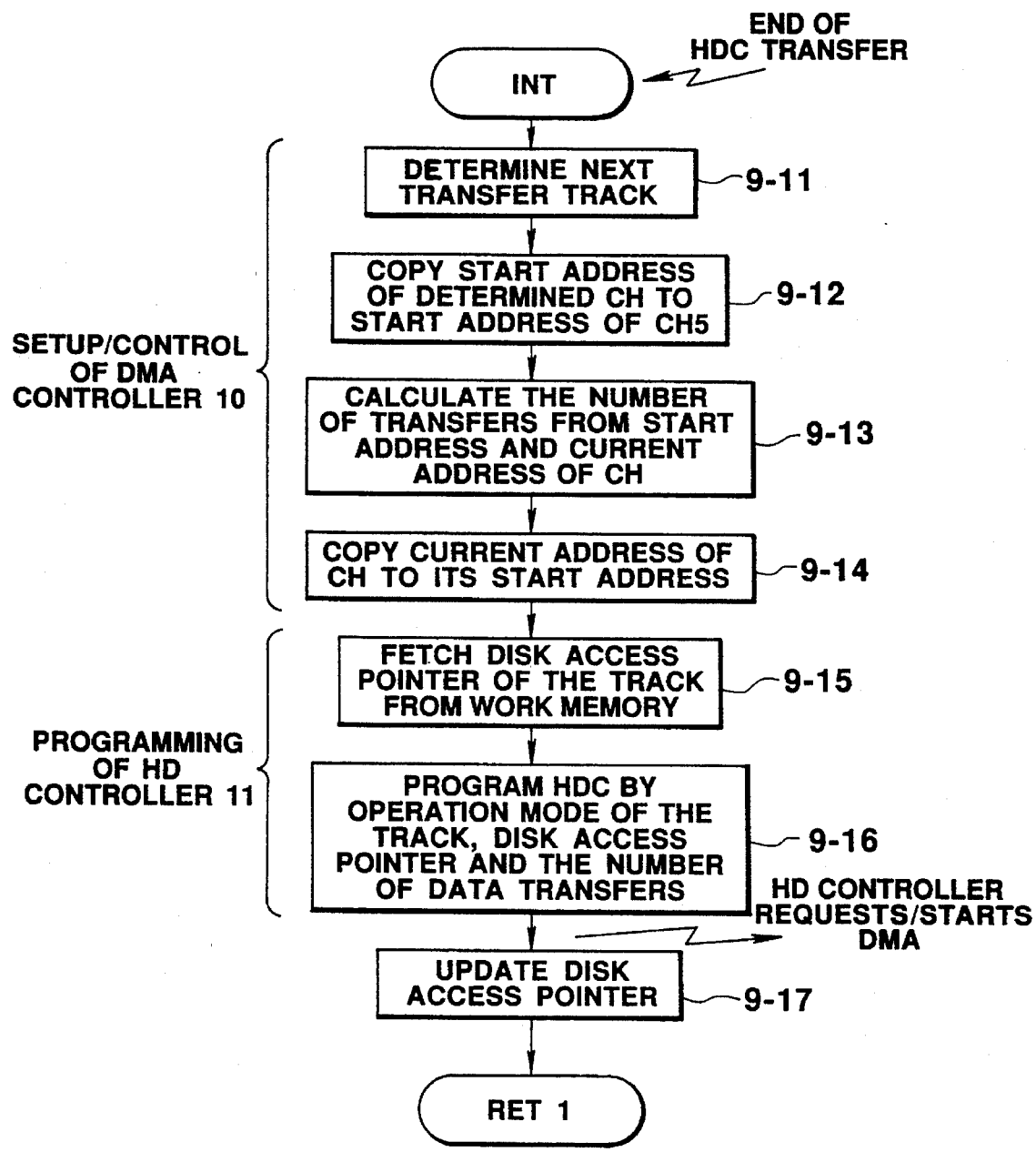
FIG. 9 is a diagram for explaining the programming operations of the DMA controller and an HD controller.

The operation of this embodiment will be described below. Flowcharts representing the operation of the CPU 1 are shown in FIGS. 7 through 9. These routines are executed by a program (software) stored in the program ROM 2. FIG. 7 represents a main routine, FIG. 8 its subroutine, and FIG. 9 an interrupt routine which is executed in response to the interrupt signal INT from the HD controller 11.

First, in step 7-1, various parameters are initialized. In step 7-2 it is determined whether the instructed mode is a record mode or a play mode. When it is the record mode, grouped data is input in step 7-3. At this time, a header indicating to which group the data belongs is recorded in the grouped data. If it is the play mode, the group data (header) of the reproduced data is read out in step 7-4. When the recording or reproduction is executed in this manner, the flow advances to step 7-5 where the request controller 19 is programmed. Through this programming, the group data is to be set. The flow then moves to step 7-6 to execute a subroutine of the DMTR operation.

Figure 13:
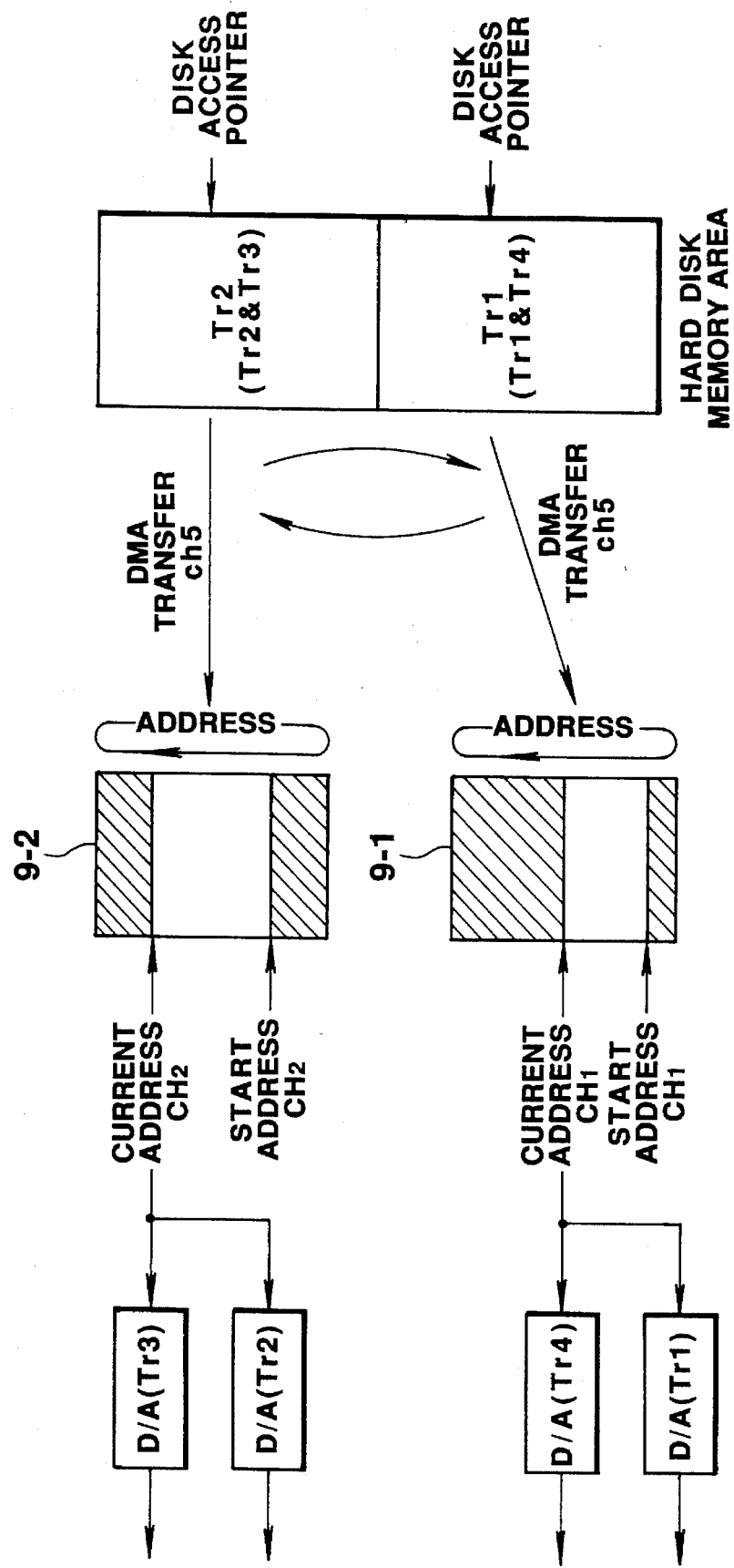
FIG. 13 is a diagram for explaining the operation of the embodiment in FIG. 1.

The subroutine of the DMTR operation is illustrated in FIG. 8. First, in step 8-11 the CPU 1 sets up which conversion, A/D conversion or D/A conversion, the individual audio I/O devices 8-1 to 8-4 should execute, by sequentially sending the designation signal CS to terminals IOWR of these audio I/O devices via the buffer 6 and the decoder 13. Suppose now that it is the play mode for the tracks Tr1 and Tr2 on the hard disk 12 (i.e., in the D/A conversion state). FIG. 13 presents conceptual illustration of the schematic operation when such mode setting is done.

In step 8-11, the addresses of Tr1 to Tr4 in the buffers 9-1 to 9-4 are initialized in the DMA controller 10. More specifically, the CPU 1 sets initial setup data to the individual registers which correspond to the channels CH1 to CH4 (those in the address register 104 and control register 105) through the data buffer 106 while permitting the address buffer 101, the register selector 103 and the channel selector 109 to designate the registers.

The buffers 9-1 to 9-4 are cyclically used to serve as ring buffers independently. The start addresses and the current addresses of each of the buffers 9-1 to 9-4 are set to coincide with each other in the initialization. (The start and current addresses of the buffers 9-1 and 9-2 are stored in those areas in the address register 104 which are associated with CH1 and CH2.) In a mode to operate only two channels, the four buffers 9-1 to 9-4 in FIG. 1 may be so connected as to serve as two buffers. In this case, management of the length of the buffers needs to be altered.

The CPU 1 moves to step 8-12, and initializes disk access pointers present in the work memory area of the RAM 3, which correspond to the respective tracks Tr1–Tr4 (Tr1 and Tr2 in this case) on the hard disk 12. (FIG. 13 shows the relation between the storage area of the hard disk 12 and the disk access pointers.)

The CPU 1 then starts A/D conversion or D/A conversion in the audio I/O devices 8-1 through 8-4 (D/A conversion in this case) in step 8-13. The CPU 1 then issues a software interrupt in step 8-14 to execute the same process as is performed when the HD controller 11 makes a program request for the data transfer between the hard disk 12 and one of the buffers 9-1 through 9-4, i.e., when the controller 11 sends the interrupt INT to the CPU 1, as will be described later.

More specifically, the operation according to the flowchart shown in FIG. 9 will be executed in step 8-14. For example, for DMA transfer of the digital audio data from the hard disk 12 to the buffer 9-1, the CPU 1 determines CH1, a channel corresponding to Tr1, as the channel of the DMA controller 10 (step 9-11).

Then, the CPU 1 copies the start address of CH1 (initialized in step 8-11 as described above) as that of CH5 (step 9-12). The operation of the DMA controller 10 in this case will be described later. The CPU 1 calculates the number of data transfers referring to the start address and the current address of CH1 (step 9-13). Since it is now in the initial state, data has not yet been transferred to the buffer 9-1 for Tr1. Therefore, data can be transferred to the entire memory area of the buffer 9-1 from the hard disk 12. When multiple tracks are in play mode, digital audio data stored in advance should be transferred promptly from the hard disk 12 to those buffers so that the data may not be sent full to one buffer, and DMA transfer may be performed sequentially for each track. Alternatively, data may be transferred full in advance from the hard disk 12 to the required buffer 9-1, 9-2, 9-3 or 9-4, then the play/record operation may be started in synchronism with the data transfer.

In step 9-14, the CPU 1 copies the contents of the current address of CH1 to the start address of CH5. The initial address will therefore be the start address in this case.

After the CPU 1 has performed each setup/control on the DMA controller 10 in steps 9-11 through 9-14 as described above, the CPU 1 moves to the next step 9-15 to read the disk access pointer of the Tr1 from the work memory of the RAM 3. In the next step 9-16, the CPU 1 programs the HD controller 11 in accordance with the operation mode (play mode in this case) of Tr1, the disk access pointer for this Tr1 and the number of data transfers from the hard disk 12 to the buffer 9-1, determined in step 9-13. The operation mode is determined depending on the contents of the area of CH1 in the control register 105 in the DMA controller 10. The operation of the HD controller 11 will be described in detail later.

As a result, the HD controller 11 makes a request (outputs DREQ) to the DMA controller 10 to perform the DMA transfer from the hard disk 12 to the buffer 9-1. The DMA controller 10 will execute DMA transfer as requested. This operation will also be described later.

In step 9-17, the CPU 1 updates the disk access pointer of Tr1 in the work memory in the RAM 3 to a value which the pointer will reach after execution of the above transfer. More specifically, as explained above, it is the DMA controller 10 which will execute all the data transfers between the hard disk 12 and the buffer 9-1 thereafter, and upon completion of this DMA transfer, the CPU 1 sets a value the disk access pointer of the hard disk 12 will take in step 9-17. Then, the flow returns to the subroutine (see FIG. 8).

As will be apparent from the later description, when the first interrupt routine in FIG. 9 is performed, and the HD controller 11 is activated once, the HD controller 11 issues an interrupt (to send the INT signal to the CPU 1) whenever transfer of the data block designated by the CPU 1 is completed, so that what the CPU 1 does is only to judge if the record/play operation is terminated, if a key input is made, or if the trigger indicated in the control data is initiated.

The CPU 1 refers to the disk access pointer (in the RAM 3) in step 8-15, and judges in step 8-16 whether or not the memory area has overflowed, i.e., whether the record/play operation is terminated. When the decision is affirmative (YES), the CPU 1 stops A/D conversion or D/A conversion in the audio I/O devices 8-1 through 8-4 in step 8-17. When the decision in step 8-16 is negative (NO), the CPU 1 checks the control data and the key input state in step 8-18. If no change has been detected, the CPU 1 returns to step 8-15 to check the disk access pointer, and will repeat steps 8-15 through 8-19.

When there is some change found in step 8-19, the CPU 1 moves from step 8-19 to step 8-20 and outputs the DMA end command (DMAEND) to the DMA controller 10 for new setting. Then, according to a new input command or the like, the CPU 1 programs the DMA controller 10 and the audio I/O devices 8-1 through 8-4 (step 8-21), and advances to step 8-22 to restart the DMA operation. The CPU 1 will return to step 8-15 after executing the routine in FIG. 9 as done in step 8-14.

In play/record mode, after the initialization in steps 8-11 through 8-14, the CPU 1 repetitively executes steps 8-15, 8-16, 8-18, 8-19, and steps 8-20 through 8-22. In response to the change command entered through the keyboard 4 (e.g., a pause (stop of A/D or D/A conversion) or a punch-in/out (switching between A/D and D/A conversions for a certain track) and a change in the control data obtained in edit mode, the CPU 1 immediately ends the DMA transfer control, and then restarts the same operation after changing the program.

Operation of Audio I/O Devices 8-1 to 8-4

The operation of the audio I/O devices 8-1 through 8-4 will now be explained referring to FIG. 10. This flowchart may be realized by either microprogram control or hard logic control, and there are various types of means available to accomplish the function.

It is determined in step 10-1 whether the signal CS to designate the audio I/O devices has been sent from the CPU 1, i.e., whether the signal is active. When the judgment is affirmative (YES), the operation mode (record, play, stop or the like) is set by the CPU 1 in step 10-2. This process is to be executed in response to step 8-11 or 8-21 in the subroutine of the CPU 1 in FIG. 8.

When the decision in step 10-1 is negative (NO), it is determined in step 10-3 if the audio I/O devices 8-1 through 8-4 are in record or play mode. If it is the record mode, a sequence of processes in steps 10-4 through 10-9 will be executed, and if it is the play mode, the flow advances to step 10-10 for execution of a sequence of processes in steps 10-10 to 10-15.

To begin with, a description will be given of the operation of the audio I/O devices set to the record mode. It is determined in step 10-4 whether it is the sampling time. Step 10-4 will be repeated until the sampling time arrives. The audio I/O devices may have hardware timers respectively to judge the sampling time from their outputs. Or a common hardware timer may be provided so that each audio I/O device can be driven according to the timer output. As will be understood from the later description, the sampling frequencies of the individual audio I/O devices 8-1 through 8-4 may be set different from one another.

When the decision in step 10-4 is YES, the given analog audio signal undergoes sample-holding (S/H) and A/D conversion in step 10-5. The DMA transfer request DRQ is set active and output to the DMA controller 10.

Upon reception of the request signal DRQ, the DMA controller 10 outputs the response signal DAK to perform DMA transfer (the detailed operation will be described later). When the judgment is YES in step 10-7, the flow goes to step 10-8 where the audio I/O device 8-1, 8-2, 8-3 or 8-4 sends the A/D-converted digital audio data via the data bus to the corresponding buffer 9-1, 9-2, 9-3 or 9-4. The DMA transfer request DRQ is then set inactive in step 10-9. Therefore, the individual audio I/O devices convert the analog audio signals given from the outside to digital audio signals, and transfer them to the current addresses of those of the buffers 9-1 to 9-4 which are designated by the DMA controller 10, as will be described later.

When the mode of the audio I/O device is judged to be the play mode in step 10-3, the flow moves to step 10-10 so that the DMA transfer request DRQ to the DMA controller 10 is set active. Upon receiving the response signal DAK from the controller 10 (step 10-11), the audio I/O device reads the digital audio data on the data bus (step 10-12), then sets the request DRQ active (step 10-13). While the operation of the DMA controller in this case will be described later, through the above operation, the contents of the current address of the buffers 9-1 and 9-2 corresponding to Tr1 and Tr2 (where the contents of the Tr1 and Tr2 areas on the hard disk 12 have already been transferred and recorded) are set in the audio I/O devices 8-1 and 8-2, as shown in FIG. 13. (As described above, since the request controller 19 actually intervenes in this operation, the output of the buffer 9-1 is input to the audio I/O devices 8-1 and 8-4 while the output of the buffer 9-2 is input to the audio I/O devices 8-2 and 8-3.) Then, it is determined in step 10-14 whether it is the sampling time. The sampling time is detected in the same manner as in step 10-4.

When it is the sampling time, the flow advances to step 10-15 where D/A conversion and low-pass filtering are executed and the analog audio signal is output to the outside.

The operations in record and play modes at a single sampling time have been described. After the process in step 10-9 or 10-15 is terminated, the flow returns to step 10-1 to sequentially perform processing at the sampling time in the same manner.

Figure 14:
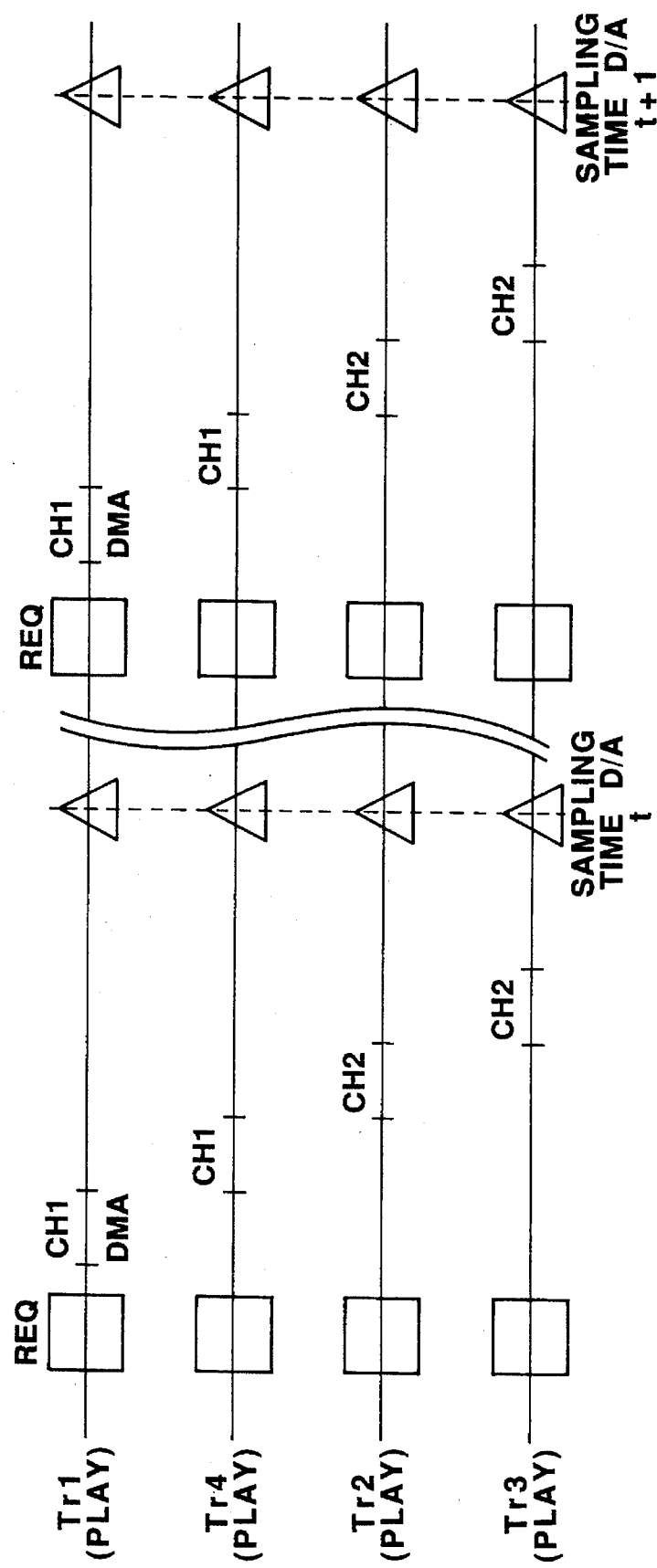
FIG. 14 is a diagram for explaining the operation of the embodiment in FIG. 1 in play mode.

FIG. 14 is an operational time chart for the audio I/O devices 8-1 through 8-4. In this chart, the audio I/O devices 8-1 to 8-4 of Tr1 to Tr4 are in play mode, and the sampling request DRQ is generated between sampling times t and t+1. Under the control of the channel CH1 in the DMA controller 10, DMA transfer from the buffer 9-1 to the audio I/O devices 8-1 to 8-4 is performed. Further, D/A conversion is performed in synchronism with sampling time t+1.

Operation of DMA Controller 10

The operation of the DMA controller 10 will be explained below referring to FIG. 11. The flowchart in FIG. 11 may be said to illustrate the operation of the service controller 108 in FIG. 2 under the control of a microprogram, or the function of the DMA controller 10 being realized by a hardware logic.

It is determined in step 11-1 whether the designation signal CS from the CPU 1 is received (active). When the signal is active (YES), it is then determined which signal, a read signal RD or a write signal WR, is received from the CPU 1 in step 11-2. When it is the read signal RD, the flow advances to step 11-3 where the contents of the registers 104 and 105, designated by the address signals provided through the address bus, are sent to the data bus so that the CPU 1 can read them. When the write signal WR is supplied, the flow moves to step 11-4 and the desired data is input to the designated register via the data bus. Steps 11-3 and 11-4 correspond to steps 8-11 and 8-21 in the subroutine of the CPU 1. Therefore, in step 11-4 the desired data is to be set in the registers 104 and 105 in FIG. 2.

When the CPU 1 terminates the accessing to or the programming of the DMA controller 10, the designation signal CS becomes inactive and the flow moves from step 11-1 to step 11-5.

It is determined in step 11-5 if the DMA transfer requests DRQ1 to DRQ4 are supplied from the respective audio I/O devices 8-1 to 8-4, and if the DMA transfer request DREQ (DRQ5) is sent from the HD controller 11. When the request is sent from any of the components, the DMA enable signal DMAENB is set to "1" (active) in step 11-6. This permits only the DMA controller 10 to use the address bus and data bus in the DMA unit, disabling any access from the CPU 1.

When multiple requests are made, the DMA controller 10 selects a channel in step 11-7 in accordance with the priority order, from CH1 down to CH5. For example, if data transfer requests are simultaneously made from the audio I/O devices 8-2 and 8-3 of the Tr2 and Tr3, since the Tr2 is given priority over Tr3, the DMA transfer of the CH2 is performed first. As apparent from the later description, since the CH5 has the lowest priority, if a data transfer request is made from any of the audio I/O devices 8-1 to 8-4 while data transfer between the hard disk 12 and one of the buffers 9-1 through 9-4 is in progress, the data transfer to the audio I/O device having made the request will be carried out by priority.

The DMA controller 10 outputs the current address of the selected channel (e.g., CH2), i.e., the contents of the current address register of CH2 of the address register 104 onto the address bus (step 11-8). Referring to the contents of the control register 105 of the selected channel (e.g., CH2), the DMA controller 10 determines in step 11-9 in which direction the DMA transfer should be performed. When the DMA controller 10 has decided to transfer data from the buffers 9-1 to 9-4 to other components (I/O), the DMA controller 10 moves from step 11-10 to step 11-11 to supply the read signal RD to the buffer selected among the buffers 9-1 through 9-4. When the data is to be transferred from other components (I/O) to the buffers 9-1 through 9-4, the DMA controller 10 advances to step 11-12 to send a write signal WR to those buffers.

Then, the response signal DAK is rendered active in step 11-13. As a result, audio data read out from, for example the current address area in the buffer 9-2 is sent to the data bus after the processes in steps 10-11 and 10-12 (see FIG. 10), and is supplied to the audio I/O devices corresponding to Tr2 and Tr3 under the control of the request controller 19.

In step 11-14, since the data transfer has been completed, the read signal RD or the write signal WR, and the response signal DAK are set inactive. In step 11-15, the DMA controller 10 increments the contents of the current address (in the address register 104 in FIG. 2) of the channel (CH2 in this case) by "1." The current address is to be increased through this process of step 11-15 every time new sampling audio data is written into or read from the buffers 9-1 through 9-4. When the current address reaches the end address for that channel, the current address is set again to the start address to realize the function of the ring buffer. The flow then returns to step 11-1 after executing the process in step 11-15.

Suppose that the audio I/O devices 8-2 and 8-3 of Tr2 and Tr3 have sent data transfer requests to the DMA controller 10. Since data transfer has been performed only on Tr2 so far, the DMA controller 10 makes an affirmative (YES) judgment in the next step 11-5. Through steps 11-7 to 11-10 and 11-12 to 11-15, the data transfer for Tr3 is conducted in the direction from the buffer 9-3 to the audio I/O device 8-3 in the same manner as above.

After such data transfer is completed, the flow moves from step 11-5 to step 11-16 to set the DMA enable signal to "0" (inactive) and disable the DMA controller 10 to exclusively use the data bus and address bus in the DMA unit by itself, allowing the CPU 1 to access these buses.

With regard to Tr2 and Tr3, the description of data transfer to the audio I/O devices 8-2 and 8-3 from the respective buffers 9-2 and 9-3 has been given. With respect to Tr1, on the other hand, data is transferred to the buffers 9-1 to 9-4 from the audio I/O devices 8-1 to 8-4 by the DMA controller 10.

Figure 10:
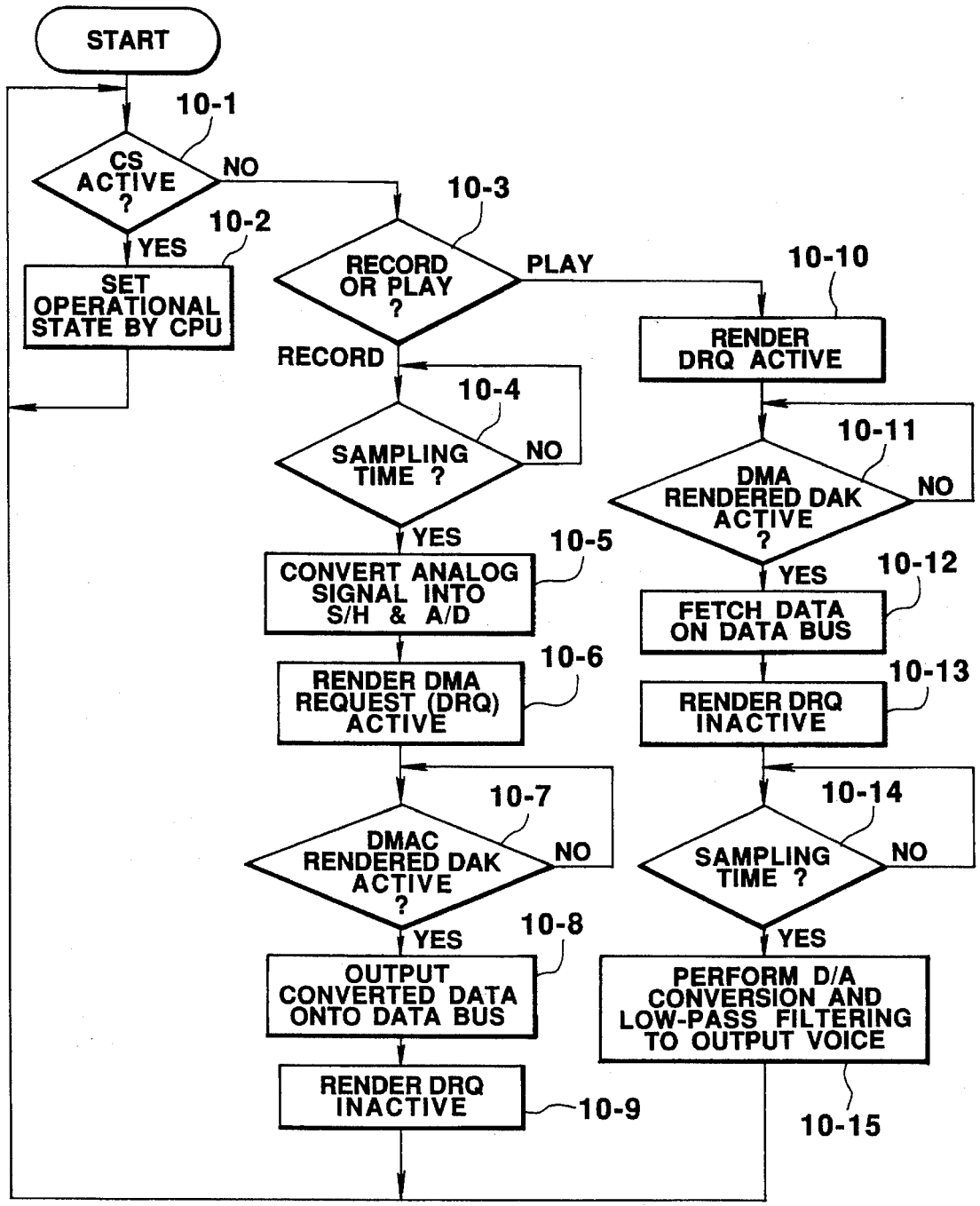
FIG. 10 is a flowchart for explaining the operation of an audio I/O device.

As shown in FIG. 14 (Tr1 to Tr4 are all in play mode in this case), the audio I/O devices 8-1 to 8-4 corresponding to Tr1 to Tr4 each output the request signal DRQ to the DMA controller 10 between sampling times t and t+1 (see step 10-10 in FIG. 10). As described above, the request signals DRQ are supplied via the request controller 19 to the DMA controller 10, so that only the request signals DRQ from Tr1 and Tr2 are actually sent to the DMA controller 10 because Tr1 and Tr4 are grouped together while Tr2 and Tr3 are grouped together.

In response to this signal, the DMA controller 10 executes steps 11-5 to 11-7 as done above, and supplies address data, indicating the address which should be read from the buffers 9-1 and 9-2, through the address bus in step 11-8. The DMA controller 10 moves to step 11-11 through steps 11-9 and 11-10 to send the read signal RD to the buffers 9-1 and 9-2 this time, and sets the response signal DAK to "1" in step 11-13.

As a result, digital audio data at the designated address in the buffer 9-1 is transferred through the data bus to the audio I/O devices 8-1 and 8-4 of Tr1 and Tr4 to be written therein, while digital audio data at the designated address in the buffer 9-2 is transferred through the data bus to the audio I/O devices 8-2 and 8-3 of Tr2 and Tr3 to be written therein. The flow returns to step 11-1 after steps 11-14 and 11-15 are executed.

The DMA controller 10 also transfers data between the hard disk 12 and the buffers 9-1 to 9-4. The address register 104 and the control register 105 in the channel CH4 are used for this operation. This data transfer is carried out after the setup/control operation to the DMA controller 10 in steps 9-11 to 9-14 and the programming operation to the HD controller 11 in steps 9-15 and 9-16 in the interrupt routine of the CPU 1 (FIG. 9) are executed.

In response to steps 9-11 to 9-14 where the CPU 1 sets up and controls the DMA controller 10, the DMA controller 10 executes steps 11-3 and 11-4. In other words, the CPU 1 determines a track for the current data transfer through the channel CH5, then sets the start address of the buffer corresponding to that track (i.e., address next to the block data previously transferred between that buffer and the hard disk 12) in the start address register of the CH5 (the address register 104 in FIG. 2). Then, the CPU 1 acquires the number of data transfers executed to this track this time from the difference between the start address and the current address (address incremented after the data transfer has been previously conducted between the buffer and the hard disk 12). Further, the CPU 1 copies the current address of the track to the start address.

The CPU 1 transfers data between those of the buffers 9-1 and 9-4 which correspond to the track in operation, and the hard disk 12 in order for each track. The data transfer following the previous data transfer (block transfer) is to be performed for each track. According to the example shown in FIG. 13, with respect to, for example, Tr1 (the same for Tr2), data whose amount corresponds to the blank portion (unshaded portion) between the start address (CH1) and the current address (CH1) in FIG. 13 is transferred from the hard disk 12. (It is apparent that the same control is performed for other tracks though the direction of the data transfer is reversed.) It is to be noted that the blank portion (unshaded portion) corresponds to the audio data which has already been output, while the shaded portion corresponds to the data which has not been output or sounded yet.

The CPU 1 programs the HD controller 11 in steps 9-15 and 9-16, allowing the HD controller 11 to issue an actual transfer request and start DMA transfer.

When the DMA controller 10 detects the transfer request from the HD controller 11 in step 11-5, the controller 10 executes a sequence of processes in steps 11-6 through 11-9, then determines in step 11-10 whether the request is to transfer data from the buffers 9-1 to 9-4 to the hard disk 12 or in the opposite direction. When the request is for the former direction, the flow moves to step 11-11. When the request is for the latter direction, the flow advances to step 11-12 after which steps 11-13 to 11-15 are to be executed. At this time, since digital audio data for one sample is transferred in a single transfer operation, the block transfer is executed by repeating the processes in steps 11-5 to 11-15 several times. The data transfer between the hard disk 12 and buffers 9-1 and 9-4 will be further described later because the HD controller 11 is involved greatly in that operation.

When the DMA transfer is completed, the request signals DRQ1–DRQ5 will not be sent forth, and the flow advances to step 11-16 from step 11-5 to set the DMA enable signal DMAENB to "0" (inactive).

In the case of the embodiment shown in FIG. 13, pieces of data recorded on the tracks Tr1 and Tr2 on the hard disk 12 are written in the buffers 9-1 and 9-2. As described above, these pieces of data consist of data input from the audio I/O devices 8-1 and 8-4 (Tr1 and Tr4) and data input from the audio I/O devices 8-2 and 8-3 (Tr2 and Tr3), respectively. When the audio I/O devices 8-1 to 8-4 issue a play request (DRQ), the request controller 19 transfers this request to CH1 to CH2. As the DMA controller 10 outputs DAK twice, the data in the buffer 9-1 is alternately supplied to the audio I/O devices 8-1 and 8-4, and the data in the buffer 9-2 to the audio I/O devices 8-2 and 8-3 alternately.

Operation of HD Controller 11

The operation of the HD controller 11 will now be explained referring to FIG. 12. The HD controller 11 may be realized by either a hardware logic or microprogram control; in either case, the operational flow in FIG. 12 can be accomplished.

First, it is determined whether or not the designation signal CS has been given from the CPU 1 (step 12-1); this signal is applied by the interrupt routine of the CPU 1 (steps 9-15 and 9-16 in FIG. 9). If the decision is negative (NO), the flow returns to step 12-1 again, but if the decision is positive (YES), the flow goes to step 12-2. In this step 12-2, it is determined whether the read signal RD or the write signal WR is sent from the CPU 1. If it is the read signal RD, the designated data in the HD controller 11 (the contents of the address register or the like) is sent through the data bus to the CPU 1.

If the write signal WR has been given from the CPU 1, the flow moves from step 12-2 to step 12-4 to set the direction of DMA transfer between the buffer and hard disk 12 which will be involved this time in the DMA transfer to be conducted by the channel CH5 of the DMA controller 10. In the next step 12-5, the access point of the hard disk 12 to be accessed is set by the access pointer (step 9-15 in FIG. 9) for the track in question which the CPU 1 has acquired from the RAM 3.

In the subsequent step 12-6, the number of transfer data (the number of digital audio data) is set in an internal counter of the HD controller 11. This transfer data number is obtained in step 9-16 in the interrupt routine of the CPU 1.

As steps 12-4 to 12-6 are executed, the HD controller 11 is programmed under the control of the CPU 1. Then, the HD controller 11 requests the DMA controller 10 to transfer data (step 12-7). It should be understood from the above that upon receipt of the interrupt signal INT from the HD controller 11, the CPU 1 executes the setup and control for the DMA transfer associated with the next track (in the order of the Tr1, Tr2, Tr3, Tr4, Tr1, ... provided that the Tr1 to Tr4 are all presently enabled) with respect to the DMA controller 10. Then, the CPU 1 leaves the HD controller 11 and DMA controller 10, permitting these controllers to perform the DMA transfer through the mutual interaction.

Figure 11:
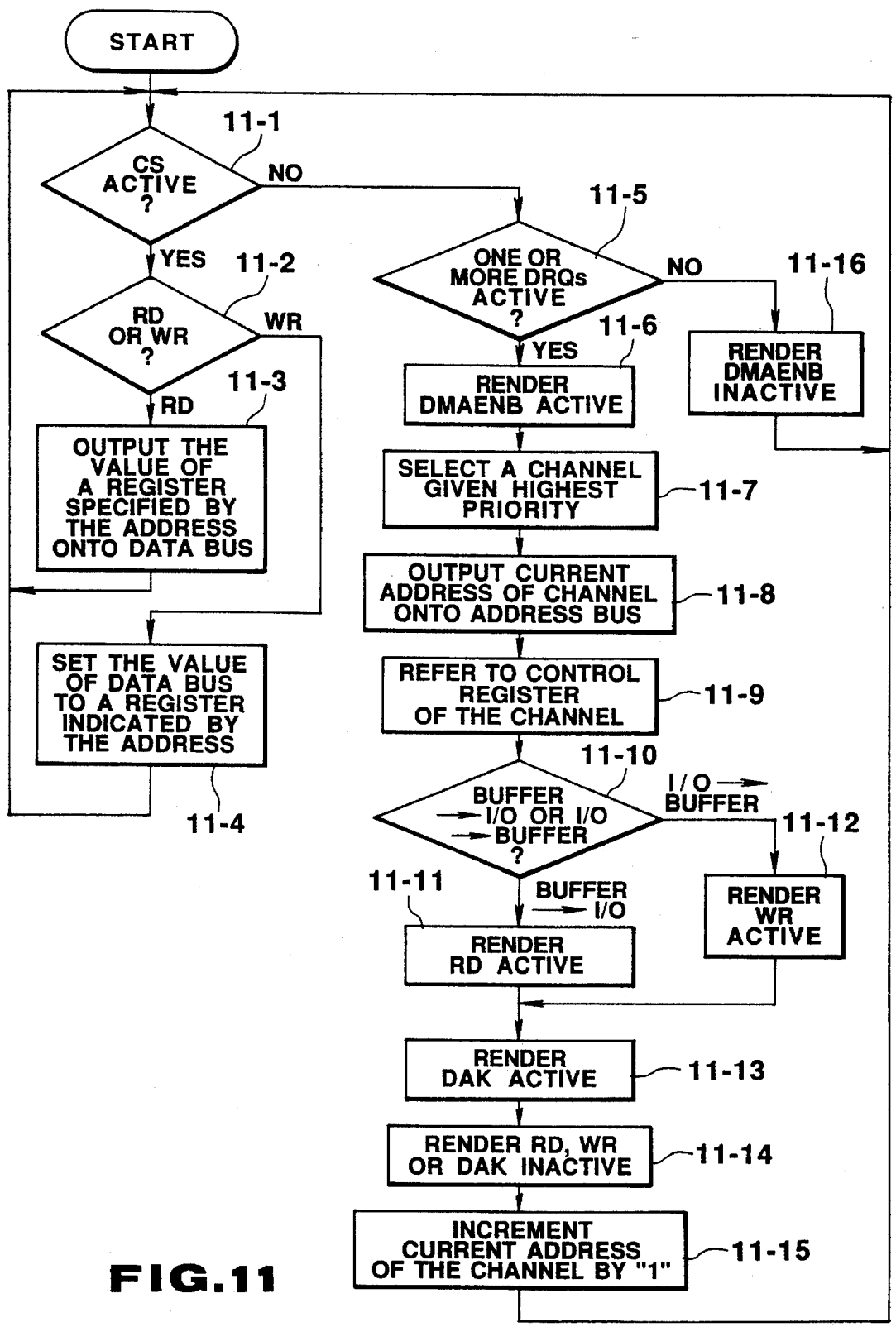
FIG. 11 is a flowchart illustrating the operation of the DMA controller.

The flow of the HD controller 11 moves from step 12-7 to step 12-8, and repeats this step 12-8 until the HD controller 11 receives the response signal DACK (DAK5) from the DMA controller 10 (see step 11-13 in FIG. 11).

When the judgment in step 12-8 is affirmative (YES), the flow advances to step 12-9 where digital audio data of one sample is transferred by the CH5 of the DMA controller 10 to decrement the transfer counter set in step 12-6 by "1" (step 12-10). According to the contents of the transfer counter, it is determined in step 12-11 whether transfer of a pre-set number of data has been completed. When the judgment is negative (NO), the flow returns to step 12-8. Therefore, the DMA controller 10 continues receiving the transfer request DRQ5 until the transfer of the preset amount of data (block transfer) from the HD controller 11 is completed. In response to the transfer request, the DMA controller 10 executes steps 11-5 to 11-15, and the HD controller 11 performs steps 12-8 to 12-11 accordingly.

When it is judged in step 12-11 that data transfer has been done, the flow moves to step 12-12 where the data transfer request DREQ (DRQ5) from the HD controller 11 to the DMA controller 10 is set to "0" (inactive). The HD controller 11 sends the interrupt signal INT to the CPU 1 to transfer data for the next track between the hard disk 12 and one of the buffers 9-1 to 9-4 (step 12-13). In response to this interrupt signal, the CPU 1 executes the interrupt routine shown in FIG. 9, as already described above.

Operation of Data Transfer Between Hard Disk 12 and Buffers 9-1 to 9-4

As data transfer between the hard disk 12 and the buffers 9-1 to 9-4 should be understood by now through the above explanation, a description will now be given of how the DMA request is made to the DMA controller 10 and how the DMA controller 10 responds to the request in a time-shared manner, referring to FIGS. 13 and 15.

Figure 15:
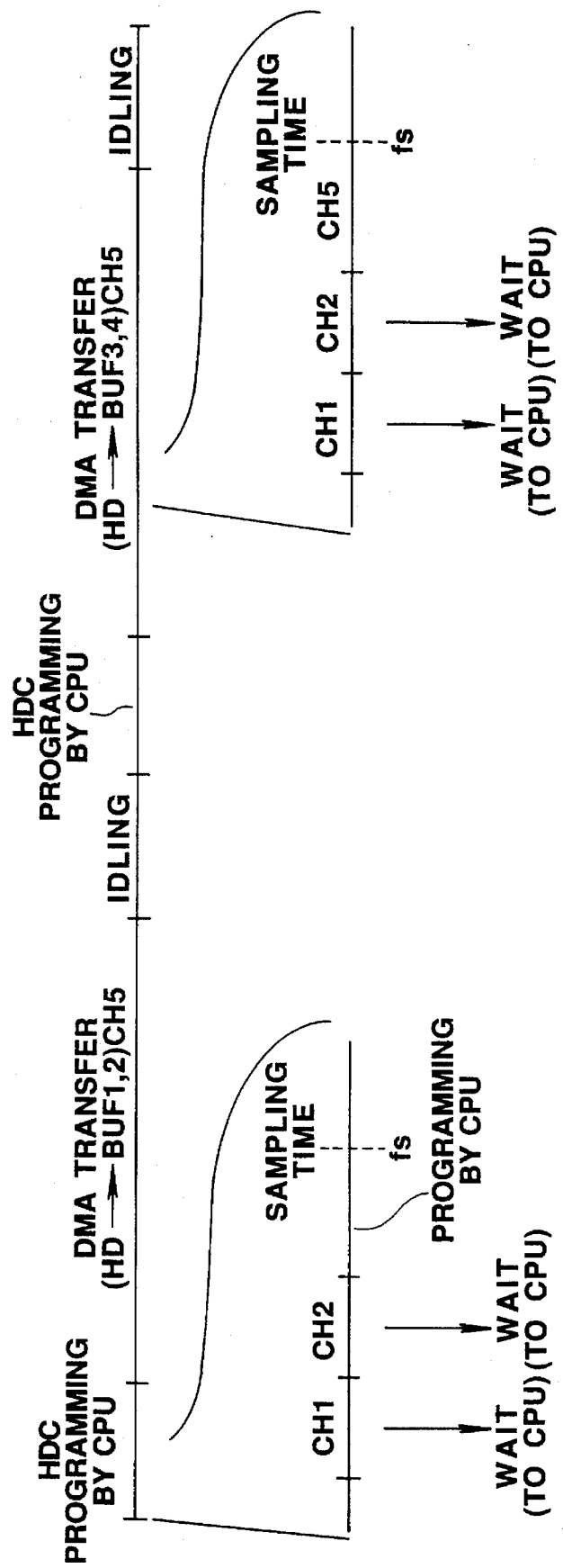
FIG. 15 is a timing chart for explaining the operation of the embodiment in FIG. 1 in play mode.

As already explained, Tr1 to Tr4 (audio I/O devices 8-1 to 8-4) are all set in play mode, and the audio I/O devices 8-1 to 8-4 request the DMA controller 10 to transfer data between the hard disk 12 and the buffers 9-1 to 9-4 every sampling time (fs in FIG. 15). Of the requests, only those for the channels CH1 and CH2 are transferred via the request controller 19 to the DMA controller 10.

Figure 12:
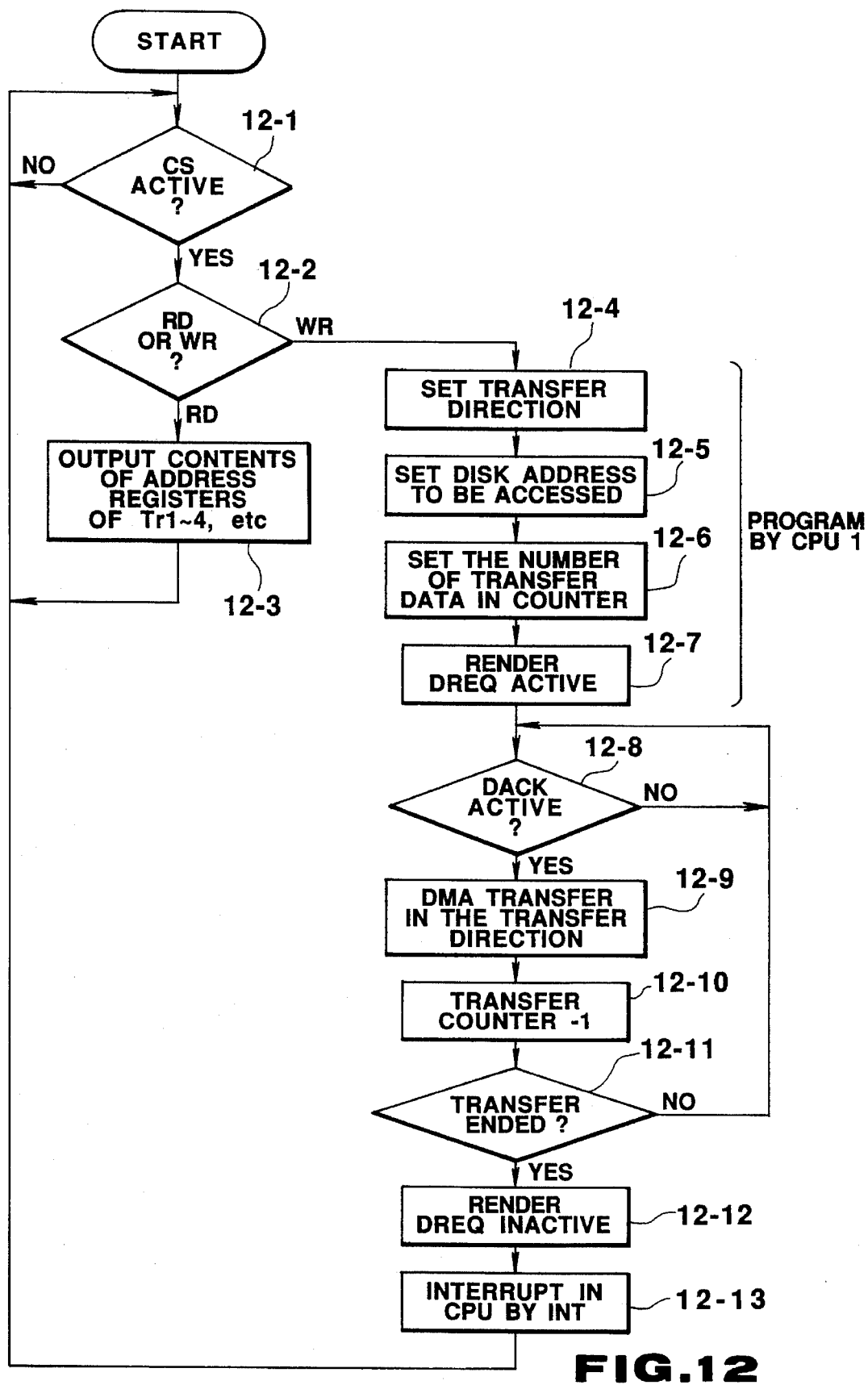
FIG. 12 is a flowchart showing the operation of the HD controller.

This request is also made while the CPU 1 is programming the HD controller 11 (steps 9-15 and 9-16 in FIG. 9 and steps 12-4 to 12-7 in FIG. 12). Upon reception of the data transfer requests from the audio I/O devices 8-1 to 8-4, the DMA controller 10 outputs the DMA enable signal DMAENB (step 11-6 in FIG. 11) as described above, disables the CPU 1 to program the HD controller 11 (WAIT), and then allows the CPU 1 to restart the programming after the DMA transfer by the channels CH1 and CH2 is completed (see FIG. 15).

While data transfer between the hard disk 12 and the buffers 9-1 and 9-2 is sequentially performed by the DMA transfer via the CH5, the audio I/O devices 8-1 8-4 make a data transfer request every sampling time (fs in FIG. 15). The DMA controller 10 this time transfers data of the channels (CH1 and CH2) which are given higher priority over the others based on the judgment made in step 11-7 in FIG. 11. Since the HD controller 11 does not receive any response signal DAK5 from the DMA controller 10 (see step 12-7 in FIG. 12) during this period, though it keeps sending the data transfer request DRQ5 to the DMA controller 10, the HD controller 11 has to wait for the next data transfer (i.e., step 12-8 is repeated).

Macroscopically, therefore, the DMA controller 10 repeats DMA transfer (block transfer) between Tr1 and Tr2 of the hard disk 12 and the buffers 9-1 and 9-2 as shown in FIG. 15. Microscopically, however, even during programming of the HD controller 11, the actual DMA transfer (by CH5) or a pause (idling), the DMA controller 10 executes DMA transfer (single transfer) between the buffers 9-1 and 9-2 and the audio I/O devices 8-1 to 8-4 for the individual channels CH1 and CH2 at each sampling timing. The DMA controller 10 is able to sufficiently deal with high-speed A/D or D/A conversion at each sampling timing.

Although one embodiment of the present invention has been described, this embodiment is simply illustrative and not restrictive. The present invention may therefore be modified in various other manners. All the modifications and applications of the present invention are within the scope and spirit of the invention, so that the scope of the present invention should be determined only by what is recited in the appended claims and their equivalents.

What is claimed is:

1. A digital recorder for recording digital data in multiple tracks, comprising:

a plurality of input/output means, each for executing an input/output operation of the digital data corresponding to each of the multiple tracks;

buffer means for exchanging the digital data with said input/output means for each track of the multiple tracks, and for temporarily storing said digital data in correspondence with said tracks;

random access memory means for exchanging said digital data with said buffer means, and having a random access storage area for the multiple tracks which is accessible for a read/write operation of said digital data;

data transfer means for executing:
(i) transfer of the digital data for each track between said plurality of input/output means and said buffer means, and
(ii) transfer of digital data for each track between said buffer means and said random access memory means,
in a time-shared manner in accordance with a predetermined order of priority for respective data transfer;

grouping means for selectively grouping any number of said multiple tracks in a changeable manner in response to a user's instruction, and including means for storing data representing a grouping thus selected;

interleave means for:
i) interleaving said digital data for at least two tracks selectively grouped by said grouping means as digital data for one track,
ii) transferring said interleaved digital data to said buffer means from said input/output means, and
iii) storing said interleaved digital data in said random access memory means through said buffer means; and deinterleave means for:
i) deinterleaving said interleaved digital data in accordance with the data, read out from said storing means, representing a grouping selectively made by said grouping means; and
ii) supplying said deinterleaved digital data as digital data for multiple tracks to said corresponding input/output means, when said interleaved digital data is read out from said random access memory means and transferred to said buffer means.

2. A digital recorder according to claim 1, wherein said grouping means separates said multiple tracks into multiple groups, said interleave means interleaves digital data of multiple tracks for each group, and said deinterleave means deinterleaves said interleaved digital data for each group.

3. A digital recorder for recording digital audio signals in multiple tracks, comprising:

a plurality of audio input/output means, each for executing an input/output operation of the digital audio signals corresponding to each of the multiple tracks;

grouping means for selectively grouping any number of said multiple tracks in a changeable manner in response to a user's instruction, and including means for storing data representing a grouping thus selected;

interleave means for interleaving the digital audio signals for at least two tracks selectively grouped by said grouping means as a digital audio signal for one track;

random access storage means for storing said digital audio signals for at least two tracks interleaved by said interleave means as the digital audio signal for one track; and deinterleave means for deinterleaving said stored, interleaved audio signals in accordance with the data, read out from said storing means, representing a grouping selectively made by said grouping means, and reproducing said deinterleaved audio signals as audio signals for said at least two tracks.

4. A digital recorder according to claim 3, wherein said grouping means separates said multiple tracks into multiple groups, said interleave means interleaves the audio signals of multiple tracks for each group, and said deinterleave means deinterleaves said interleaved audio signals for each group.

5. A digital recorder comprising:

multiple audio input/output means, each for selectively executing an A/D conversion and a D/A conversion corresponding to each of multiple tracks;

multiple buffer means for exchanging digital audio data respectively with said multiple audio input/output means, and for temporarily storing said digital audio data for each track;

random access memory means for exchanging said digital audio data with said multiple buffer means, and having a storage area for multiple tracks which is accessible for a read/write operation of said digital audio data;

data transfer means for executing:
  (i) transfer of digital audio data between said multiple audio input/output means and said multiple buffer means, and
  (ii) transfer of digital audio data between said multiple buffer means and said random access memory means,
  in a time-shared manner in accordance with a predetermined order of priority for respective data transfer;

grouping means for selectively grouping any number of said multiple tracks in a changeable manner in response to a user's instruction, and including means for storing data representing a grouping thus selected;

first means for sequentially and cyclically supplying the digital audio data to corresponding buffer means in order to make said digital audio data for at least two tracks selectively grouped by said grouping means as digital audio data for one track; and second means for, when said digital audio data for said at least two tracks is sequentially read out from said random access memory means and supplied to said multiple buffer means, separating said digital audio data in said multiple buffer means into digital audio data for each track in accordance with the data, read out from said storing means, representing a grouping selectively made by said grouping means, and for supplying said separated digital audio data to said multiple audio input/output means.

6. A digital recorder according to claim 5, wherein said multiple audio input/output means each have request means for requesting said data transfer means to transfer said digital audio data between said audio input/output means and corresponding buffer means at a rate corresponding to a sampling frequency of said digital audio data, and said data transfer means executes a single transfer of digital audio data associated with a single sampling in response to a request from said request means.

7. A digital recorder according to claim 5, wherein said external memory means has request means for requesting said data transfer means to transfer said digital audio data between said external memory means and said multiple buffer means for enabled tracks in order, and said data transfer means executes a block transfer of digital audio data associated with multiple samplings with corresponding buffer means in response to a request from said request means.

8. A digital recorder according to claim 5, wherein when requested from said multiple audio input/output means and said external memory means to effect transfer of digital audio data, said data transfer means executes transfer of said digital audio data between one of said multiple audio input/output means and associated one of said multiple buffer means by priority.

9. A digital recorder according to claim 6, wherein said first means and said second means supply transfer requests from said request means as altered request commands to said data transfer means in accordance with a grouping made by said grouping means.

* * * * *